(12) United States Patent
Tsui et al.

(10) Patent No.: US 8,209,275 B2
(45) Date of Patent: *Jun. 26, 2012

(54) INTELLIGENT AGENT FOR DISTRIBUTED SERVICES FOR MOBILE DEVICES

(75) Inventors: Chi Ying Tsui, Hong Kong (CN); Ross David Murch, Hong Kong (CN); Roger Shu Kwan Cheng, Hong Kong (CN); Wai Ho Mow, Hong Kong (CN); Vincent Kin Nang Lau, Hong Kong (CN)

(73) Assignee: Tuen Solutions Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/222,175

(22) Filed: Aug. 31, 2011

(65) Prior Publication Data

US 2011/0320518 A1 Dec. 29, 2011

Related U.S. Application Data

(63) Continuation of application No. 12/051,532, filed on Mar. 19, 2008, now Pat. No. 8,032,472.

(60) Provisional application No. 60/910,109, filed on Apr. 4, 2007.

(51) Int. Cl.
*G06F 17/00* (2006.01)
*G06N 5/00* (2006.01)

(52) U.S. Cl. .................................................. 706/45
(58) Field of Classification Search ................ 706/45
See application file for complete search history.

(56) References Cited

U.S. PATENT DOCUMENTS

| | | | |
|---|---|---|---|
| 5,555,490 A | 9/1996 | Carroll | |
| 5,774,338 A | 6/1998 | Wessling, III | |
| 5,884,184 A | 3/1999 | Sheffer | |
| 6,466,232 B1 | 10/2002 | Newell et al. | |
| 6,801,140 B2 | 10/2004 | Mantyjarvl et al. | |
| 7,167,920 B2 | 1/2007 | Traversat et al. | |
| 7,203,732 B2 | 4/2007 | McCabe et al. | |
| 7,417,557 B2 | 8/2008 | Osterioh et al. | |
| 7,698,546 B2 | 4/2010 | Stemen | |
| 7,764,247 B2 | 7/2010 | Blanco et al. | |
| 7,889,124 B2 | 2/2011 | Islam et al. | |
| 7,941,501 B2 | 5/2011 | McCabe et al. | |
| 8,032,472 B2 * | 10/2011 | Tsui et al. ...................... | 706/46 |
| 2002/0028704 A1 | 3/2002 | Bloomfield et al. | |
| 2002/0123337 A1 | 9/2002 | Dharia et al. | |
| 2004/0088347 A1 | 5/2004 | Yeager et al. | |

OTHER PUBLICATIONS

International Search Report and Written Opinion, dated Aug. 19, 2008, PCT application No. PCT/US08/59036, 10 pages.

(Continued)

*Primary Examiner* — Michael B Holmes
(74) *Attorney, Agent, or Firm* — Turocy & Watson, LLP

(57) ABSTRACT

Mobile devices, mobile device systems and methods applying to mobile devices are provided that employ intelligent agents in combination with a wide array of remote utilities and information sources to facilitate improving a mobile device user's experience. By collecting contextual information from numerous information sources related to the mobile device user's context, more accurate and optimized determinations and/or inferences are formed relating to which remote utilities to make available to the mobile device user. This facilitates less confusion for the user in selecting desired mobile device content, services, and/or applications. The devices, systems, and methodologies also provide for an improved user experience in an open remote utility provider model.

45 Claims, 13 Drawing Sheets

OTHER PUBLICATIONS

International Search Report and Written Opinion, dated Aug. 22, 2008, PCT application No. PCT /US08/59026, 10 pages.

Effects of Haptization on Disabled People, Aoki, E.; Hirooka, J.; Nagatomo, N.; Osada, T.; Nishino, H.; Utsumiya, K.; Complex, Intelligent and Software Intensive Systems (CISIS), 2010 International Conference on Digital Object Identifier: 10.11 09/CISIS.2010.120 Publication Year: 2010, pp. 1153-1157.

Intelligent control of the lift model, Cernys, P.; Kubilius, V.; Macerauskas, V.; Ratkevicius, K.; Intelligent Data Acquisition and Advanced Computing Systems: Technology and Applications, 2003. Proceedings of the Second IEEE International Workshop on Digital Object Identifier: 10.11 09/IDAACS.2003.1249600 Pub Year: 2003, pp. 428-431.

Non-Final Office Action for U.S. Appl. No. 12/051,532, dated Feb. 2, 2011.

* cited by examiner

INTELLIGENT AGENT FOR DISTRIBUTED SERVICES FOR MOBILE DEVICES

RELATED APPLICATIONS

This application is a Continuation of U.S. patent application Ser. No. 12/051,532, filed Mar. 19, 2008, entitled "INTELLIGENT AGENT FOR DISTRIBUTED SERVICES FOR MOBILE DEVICES", which claims the benefit of priority under 35 U.S.C Section 119 from U.S. Provisional Patent Application Ser. No. 60/910,109 entitled "ADVANCEMENTS FOR WIRELESS DEVICES AND WIRELESS COMMUNICATIONS", filed on Apr. 4, 2007. The entirety of these applications are incorporated herein by reference.

TECHNICAL FIELD

The present invention relates to mobile devices, systems, and methodologies, and more particularly to facilitating the automatic selection of remote utilities or services available to users of mobile devices, systems, and methodologies by employing intelligent agents therein.

BACKGROUND

There is already a functional overload of applications and services available or accessible through a mobile device, and this is by way of a single remote utility provider or carrier. In the future, the problem can be envisioned as becoming only more complex and overwhelming for mobile device users as remote utility providers or carriers become more complex in terms of the number of services offered. What will be needed is a way to sift through the sea of applications and services that will be available from one or more disparate networks, especially if the role of traditional network providers (e.g., AT&T, Verizon, T-mobile, Sprint, . . . ) lessens, and third party mobile services, content, and applications become more ubiquitous.

Conventional mobile devices have access to a vast amount of remote utilities through a single carrier (e.g., a single remote utility provider). A remote utility can include services, applications, and content provided to a mobile device from a remote location. For example, ringtones, display wallpapers, mobile device games, text messaging services, data update services, synchronization services, or Bluetooth applications, among numerous others, can be provided to a mobile device through the device's primary carrier. Selecting these services, applications, or content can be a complicated process. Moreover, there can be overlap between remote utilities that can cause confusion as to what benefit can be gained by accessing one remote utility in favor of a second remote utility. This can require the user to further research the functional aspects and compatibilities of the various remote utilities to ensure that the user's needs are met by the particular set of remote utilities they select to run on their mobile device.

The wide array of services, applications and content, in addition to determining the particular benefit on any set of these remote utilities can be overwhelming for the end user. Frequently, the end user can merely select a simple and non-optimal set of remote utilities just to reduce the confusion associated with selecting a more optimal set of remote utilities. For example, a user can more easily select standard ringtones and a general news content provider rather than selecting custom ringtones, a map application, a social networking application, and a news content provider that gathers only news stories of particular interest to the mobile device user, where selecting the more complex set of remote utilities presents the user with entering additional information to access the social network, selections on what types of news stories are of interest, and ensuring that the applications will not cause mobile device crashes, among other complicating aspects.

Further, where a particular carrier does not carry a desired remote utility, the mobile device user can be denied access to and enjoyment of the particular remote utility. The mobile device market has begun to respond by offering "open" mobile devices that can access remote utilities from other carriers (e.g., remote utility providers). This can allow the user to access a particular remote utility not offered by a primary carrier, but also can further complicate selection of an available remote utility. This increased complexity can occur both in gaining knowledge of other available third party remote utilities and also in gaining understanding of the functional overlap and particulars of running a third party remote utility.

Where the trend towards greater numbers of remote utilities and open mobile devices continues, the library of available remote utilities can be seen as growing at an extremely high rate. The already vast number of choices in remote utilities can easily be seen to only grow more complex and confusing. Further, in addition to the sheer weight of the number of remote utilities that can become available, there can be an increased burden to proper selection of particular utilities that will run properly on the wide variety of mobile devices in use, and moreover, to ensuring that the desired functionality is optimally selected (e.g., reducing overlap or conflict between employed remote utilities, selecting a remote utility that most closely provides the functionality or information that the user desires, lowest overall cost of a set of remote utilities, . . . ).

It can be envisioned that the trend to increasing numbers and complexity of third party remote utilities can eventually lead to the elimination of primary carriers in the sense that a primary carrier provides the bulk of the remote utilities for a mobile device while third party remote utility providers only fill in missing needs. Where the primary carrier model collapses, nearly all of the remote utilities for mobile devices can be envisioned as being acquired from a huge marketplace of remote utility providers. This can lead to informational overload of the user. A user can be faced with the daunting task of discovering a remote utility in a deep sea of available remote utilities, something like finding a needle in a gigantic haystack.

Where there is conventionally no truly effective means of sifting through the services, applications, and content available to a mobile device user in a post-primary carrier model (and even to large degree in a primary carrier model), it can be presumed that most mobile device users will be using remote utilities that are far from optimal for a particular user's needs. For example, where there are hundreds or thousands of news content sources available, it can be nearly impossible for a mobile device user to select one or two most optimal news content sources based on their particular interests, geographic location, age, sex, health status, form of employment, and income levels, among numerous other factors.

Extending this example, where the mobile device user travels, the optimal selection of a news content provider can significantly change as the user changes locations. Similarly, where the user changes activities (e.g., goes from work to a weekend hiking) the optimal news content provide can be substantially different (e.g., a news content provider that focuses on Wall street news is less optimal than a news content provider that focuses on road conditions and weather in the area the user would be hiking). Where the user can be expected to rarely want to put in the time and effort to keep a news source optimal (or even be capable of properly selecting an optimal remote utility), the sure change in a user's daily life also can ensure that the user's remote utility sections will be sub-optimal.

Additionally, where new remote utilities and new remote utility providers become available, an optimal remote utility can become available for a user without the user ever being aware of the existence of the new remote utility. This can further result from patterns or trends in the user's life being present without the user being aware of them. For example, a mobile device user can buy coffee at a particular shop every day without the user ever thinking about other coffee shops providing the same service at a lower price. Where the user does not observe this pattern, the user is unlikely to access a remote utility that, for example, can track coffee prices of regional coffee shops. However, where such an exemplary remote utility is available, it can be seen that the mobile device user could acquire additional benefit by employing that particular remote utility.

The wide variety of conventionally existing remote utilities, remote utility providers, and the emergence and possible future domination of distributed remote utility providers and the accompanying dearth of additional remote utilities present a daunting challenge to optimized selection of remote utilities for mobile devices and their users. Devices, systems and methodologies are needed to assist in sifting, sorting, and selecting remote utilities for mobile devices in an efficient and more optimal manner. Further, additional benefit and optimization can occur where consideration is made for the dynamic nature of the human experience in regards to the nearly ubiquitous presence of mobile devices in our daily lives. Employing improved and novel devices, systems and methodologies to assist in navigation and selection from the vast quantity of conventional and future remote utilities appropriate and desirable for dynamically changing user contexts under single and distributed carriers can provide an improved user experience.

SUMMARY

The following presents a simplified summary of the subject innovation in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The various embodiments of the subject disclosure relate to employing intelligent agents to analyze information provided from information sources to facilitate more optimized access to remote utilities for mobile devices. For instance, in one non-limiting embodiment, remote utility components include information components, content components, service components, application components, or combinations thereof. Information source components provide contextual information to mobile devices via sensory data components, information look up components, user interface components, or any combination thereof, such that a mobile device can determine subsets of the remote utility components to make available to a user of the mobile device based on the contextual information provided to the mobile device.

In another non-limiting embodiment, an intelligent agent component processes the input data for the current context of the mobile device based on usage patterns determined from the usage store, then predictively determines one or more actions that the user is likely to take next, and then initiates one or more processes that facilitate performance of the one or more actions. These and other embodiments are described in more detail below.

To the accomplishment of the foregoing and related ends, the following description and the annexed drawings set forth in detail certain illustrative aspects of different embodiments described herein. However, these aspects are indicative of but a few of the various ways in which the principles set forth herein may be employed. Other aspects, advantages and novel features will become apparent from the following detailed description when considered in conjunction with the drawings.

DETAILED DESCRIPTION

Figure 1:
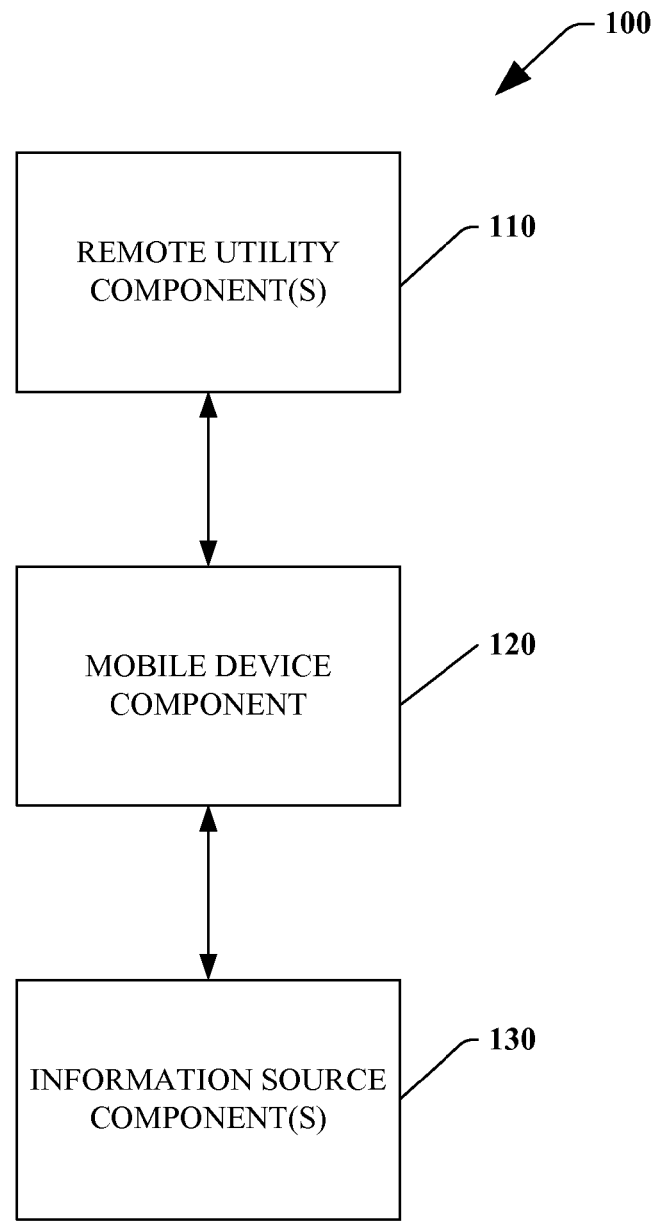
FIG. 1 is a high-level diagram of a system in accordance with the subject invention.

Various embodiments are now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "handler," "model," "system," and the like are also intended to refer to a computer-related entity, either hardware, a combination of hardware and software, software, or software in execution, in addition to electro mechanical units. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems via the signal).

Overview

The modern mobile device user is already overloaded with available applications and services, even through a single remote utility provider. In the future, the problem can be envisioned as becoming only more complex and overwhelming as additional remote utilities become available through carriers, third party remote utility providers or under distributed remote utility provider models. Employing intelligent agents is a way to sift through the sea of applications and services that will be available from one or more disparate networks, especially if the role of traditional network providers (e.g., AT&T, Verizon, T-mobile, Sprint, ... ) lessens, and third party mobile services, content, and applications become more ubiquitous. These intelligent agents can be provided with quantities of contextual information through numerous information sources to improve the accuracy with which they can facilitate determining appropriate remote utilities to make available to the mobile device user. Additionally, distributed remote utility components or information pertaining thereto can be aggregated to provide more efficient determinations of appropriateness of remote utilities to the context of the mobile device user.

To handle the trends in proliferation and distribution of services available through mobile devices, the invention provides an intelligent agent that handles the problem of service functionality overload on behalf of the user. The intelligent agent can selectively expose relevant functionality respecting products, services and applications available for the mobile device, hiding the details, learning the habits of the user, and predicting possible next actions of the user, in order to make suggestions. Based on usage, the mobile device can learn what the user likes and how the user tends to behave. Information sources, for example, GPS information, can be integrated into the predictive information, making the mobile device operate as an intelligent machine that makes decisions on behalf of the user based on all available data about the user, simplifying user interfaces by reducing the number of unlikely choices and actions, and making the sheer number of services available more manageable. The intelligent agent can thus function as an inference engine that predicts a user's needs by learning daily habits and presenting a subset of options and actions based on its intelligent learning.

The various embodiments of the subject disclosure relate to employing intelligent agents to analyze information provided from information sources to facilitate more optimized access to remote utilities for mobile devices. Conventional mobile devices have access to numerous remote utilities, typically through a primary remote utility provider or carrier (e.g., AT&T, Verizon, Sprint, ... ). Third party remote utility providers are beginning to provide additional remote utilities outside of the primary carriers (e.g., open structured mobile device networks). Where there are a large number of remote utilities available, selection of more optimal remote utilities can be difficult for mobile device users. These difficulties can include selection of an appropriate remote utility to fulfill a particular mobile device user's needs, selection of compatible remote utilities (e.g., remote utilities that will operate together without causing mobile device crashes or degradation of remote device performance), selecting the lowest cost remote utilities to fulfill a user's needs, selecting new remote utilities based on changing contexts, selecting new remote utilities based on the availability of newly released more optimal remote utilities, or combinations thereof among other selection processes, in the context of a large number of remote utilities being available for selection.

Where the number of remote utilities is large, these selection processes can be difficult because the user can be required to determine which remote utility is the most optimal based on a very large number of selection criteria. Where the number of criteria is dauntingly large, a user can often be overwhelmed and can therefore select a less optimal remote utility in order to reduce the amount of time and energy that must be extended to select a more optimal remote utility. Further, a user can be unaware of certain available remote utilities that could be more optimal than other remote utilities being considered. Moreover, a user can often opt not to update or change a remote utility based on the changing context of the user and the mobile device simply because the process is too onerous. Additionally, a user can be unaware of behavioral or contextual patterns that could benefit by employing certain remote utilities and thus can be unaware that they should even be looking for this particular type of remote utility.

In contrast, in accordance with aspects of the disclose subject matter, sourcing information from a variety of information sources related to the context of the mobile device and the mobile device user can facilitate better selection from available remote utilities. Information sources can include environmental sensors, health sensors, information stores, location or positional determinations or inferences, user histories, profiles, video data, audio data, acceleration information, or just about any other type of information related to the context of a mobile device or mobile device user. For example, where a user and their mobile device are stuck in traffic on the way to an important client meeting, a plurality of information sources can provide information such as the GPS location of the user's mobile device, information relating to traffic conditions for one or more routes between the current position and the destination, the current time, the estimated time to arrival, the importance level of the scheduled meeting (e.g., from accessing a user's calendar information), contact phone numbers for the meeting attendees (e.g., from accessing a user's contacts information), weather conditions (e.g., from accessing local weather information sources, temperature sensors, humidity sensors, barometric sensors, ... ), analytical data from sensors in the vehicle the user is driving to determine mechanical conditions (e.g., malfunctions, fuel remaining, ... ), and a slew of additional information related to the context of the user. A mobile device in accordance with the disclosed innovation, for example, can employ the information provided to seek out remote utilities pertinent to the current context of the mobile device user. For example, the information can be employed to seek out a mapping remote utility that can provide alternate routes to the user to bypass the heavy traffic, gas pricing remote utilities that can indicate the lowest priced fuel within the estimated range of the vehicle under the current fueling conditions, a message distribution remote utility to allow the user to send a single message to all meeting participants that the user is stuck in traffic, or any other of numerous possible remote utilities that can be available to the mobile device. One of skill in the art will appreciate that a nearly limitless number of information sources can provide information to a mobile device to facilitate selecting more optimal remote utilities and that all such information sources are considered within the scope of the subject innovation.

Similarly, in accordance with aspects of the disclosed subject matter, employing an intelligent agent to analyze contextual sourced and stored information can result in automatic determinations or inferences about more optimal remote utilities. Where information can be sourced to a mobile device as described herein, an intelligent agent can be employed to analyze the current context of the user and the mobile device to facilitate selecting more optimal remote utilities. The intelligent agent can provide deterministic or inferential (e.g., operating as an inference engine) decisions regarding what constitutes a more optimal remote utility and can employ these decisions in automatically selecting remote utilities to make available to the user through the remote device. For example, an intelligent agent can analyze the information provided by the sources in the above example to determine that fuel is running low and can alert the user and also automatically select a mapping remote utility to provide a map to the user to the nearest fueling station, can infer that the meeting can be rescheduled based on historic data relating to rescheduling meetings with these specific meeting participants and can seek out a rescheduling remote utility to determine an available time to reschedule the meeting, can seek out a text messaging remote utility and populate a text message with the rescheduling notice and can notify the user that the meeting can be rescheduled and that a text message is available to notify the meeting participants. Numerous other examples of determinations and inferences that can be made will be apparent to one of skill in the art and all such determinations and inferences are to be considered with the scope of the disclosed subject matter.

Further, in accordance with aspects of the disclosed subject matter, remote utilities can be aggregated in an aggregator component to provide more efficient determinations of appropriate remote utilities. By optionally aggregating available remote utilities or information regarding the remote utilities, a centralized lookup or access point can be established to reduce communications protocol overhead. For example, rather than seeking out and establishing communications with hundreds or thousands of remote utility providers, the overhead of establishing communications can be spent once with an aggregator component, whereby the mobile device can seek out appropriate remote utilities. When an appropriate remote utility is located, the utility can be accessed through the aggregator or the mobile device can be redirected to the appropriate location to access the remote utility. The aggregator, in some aspects of the subject innovation, can function in a manner similar to a web crawler related to remote utilities and remote utility providers, such that information about available remote utilities can be crawled and stored for searching by mobile devices seeking this information. In other aspects of the subject innovation, the aggregator can function as a central store (e.g., mirror location) for available remote utilities from one or more remote utility providers and thus can provide direct access to stored remote utilities to a mobile device.

Moreover, in accordance with aspects of the disclosed subject matter, these types of devices, systems, and methodologies can function in primary carrier models, distributed remote utility provider models, or combinations thereof. Where the primary carrier (e.g., remote utility provider) model is employed, analysis by an intelligent agent of sourced information can be conducted to automatically query remote utilities provided by primary carriers. Similarly, where third party remote utilities are available, the automatic query can be extended to include third party remote utilities. Furthermore, in non-primary carrier models (e.g., distributed remote utility provider models) the automatic query can be further extended to search a plurality of remote utility providers and/or can be directed to aggregators of distributed remote utility providers or remote utilities as herein described.

In addition to the contemporaneous seeking of remote utilities as described herein, the intelligent agent can further, in accordance with aspects of the disclosed subject matter, seek out probable alternatives to more optimal remote utilities. Further, pre-fetching can be employed by devices, systems, and methodologies in accordance with aspects of the disclosed subject matter. Continuing the example where a user is stuck in traffic, the intelligent agent can suggest rescheduling and prepare a text message to the meeting participants as herein described, however, the intelligent agent can also infer that there is a sufficient probability that the meeting cannot be rescheduled and, for example, can seek out a video conferencing remote utility that can facilitate the user conducting a video conference (e.g., using a camera and duplex speaker phone in the mobile device) with the other meeting participants after going to a nearby hotel (e.g., the intelligent agent can seek out a remote utility that locates nearby hotels with available business centers). Additionally, where this exemplary scenario is playing out, the intelligent agent can select a remote utility to access a graphic presentation in the user's laptop computer resting in the back seat, while the user is driving to the nearby hotel, such that by pre-fetching the presentation it can be forwarded on to the other meeting participants so that the video conference can begin that much sooner.

In another example, where a user's context is that of heading to an airport for a 45-minute flight, an intelligent agent can seek out a world news content provider remote utility to pre-fetch the evening news. In contrast, where the user is heading to the airport for a nine-hour trans-pacific flight, the intelligent agent can pre-fetch the world news, two new movie sequels that the user has seen the earlier movies for, as well as a few hours of home television recorded on the user's personal video recorder. One of skill in the art will readily appreciate that with the ever increasing amounts of memory available in mobile devices, increasing amounts of storage space can add substantial depth to seeking out more optimal remote utilities, facilitating alternate probabilistic determinations, and/or pre-fetching of remote utilities, and that all such embodiments are within the scope of the disclosed subject matter.

Intelligent Agent for Distributed Services for Mobile Devices

As mentioned herein, conventional mobile device systems can rely on the user to navigate and select the most appropriate remote utilities to meet their needs. This can be extremely time consuming and provide sub-optimal results where the user can be overwhelmed with the sheer volume of choices available for remote utilities. Further, a user can frequently be ill equipped to manage making determinations as to an optimal remote utility where there are not only large numbers of remote utilities available, but each remote utility can have a large number of selection criteria and these criteria often are not the same across several similar remote utilities. For example, a news content remote utility can be selected based on the type of news, the geographic area of coverage, the cost of the service, the frequency of news updates, and the format in which the information is provided, among numerous other possible selection criteria. Where several news content remote utilities are available to a mobile device user through a mobile device, the user can be required to take the time to select the most optimal news content provider by determining which of the criteria are most important to the user and how well each available service fulfills those criteria. Where, for example, a first news content provider specifies the type of news as financial news and a second specifies the type of news as stock market news, it can be increasingly difficult for a user to discern between the two services based on even one criteria.

The problem with selecting remote utilities can be magnified where the user's context changes dynamically. Where selecting remote utilities can be time consuming and frustrating to a user in a static context, a changing context can force a user to continually monitor and update the remote utilities being employed in order to keep them up to date with the current context of the user. For example, where a user employs a weather service remote utility for Denver, and the user flies to Miami, the user can be required to update the remote utility to reflect the change in geographic location. If the remote utility does not extend to the new location, the user can be forced to search out another remote utility that does cover Miami. Similarly, where new remote utilities become available or new usage patterns for the user emerge, the user can be unaware of available remote utilities that can fulfill the user's needs. By employing an intelligent agent to automatically make determinations regarding available remote utilities, much of the onus on the mobile device user can be relieved.

Turning to the figures, FIG. 1 illustrates a high-level diagram of a system 100 in accordance with the subject invention. System 100 can include one or more remote utility components 110. Remote utilities components 110 can include services, applications, and content for mobile devices. For example, a news content provider, a mapping application, or reservation booking service can be remote utilities. One of skill in the art will appreciate that nearly limitless number of remote utility components 110 are possible and that all such remote utilities are considered within the scope of the disclosed subject matter. The remote utility components 110 can be provided by a single remote utility provider (e.g., a carrier), by third party remote utility providers, in a distributed remote utility provider model where a primary carrier (e.g., remote utility provider) does not exist, or combinations thereof.

Further, remote utility components 110 can be provided as a single remote utility component 110 or by aggregation as a library of remote utility components 110. The aggregation of remote utility components 110 can be under a single remote utility provider (e.g., carrier) or by third party aggregators in either a primary carrier or distributed remote utility provider model.

The remote utility components 110 can be communicatively coupled to a mobile device component 120. The mobile device component can employ the remote utility in a manner appropriate to the design of the remote utility components 110. For example, where the remote utility component is a news content provider remote utility, the content, for example, can be streamed or downloaded to the mobile device. Similarly, for example, where the remote utility component is a personal information manager (PIM) application, the remote utility can be downloaded and run on the mobile device or can be run in a distributed computing fashion where information relevant to the PIM is uploaded and downloaded between the mobile device and the remote utility as appropriate.

The mobile device component 120 can be communicatively coupled to information source components 130. Information source components 130 can include sensors, user profiles, information stores, image data, audio data, GPS data, or any of a nearly limitless number of other types of data and information that can relate to the context of the user of a mobile device. One of skill in the art will appreciate the nearly limitless number of information sources that can function as information source components 130 and appreciate that all such information sources are within the scope of the disclosed subject matter.

Information related to the context of a mobile device user can be communicated from the information source component 130 to the mobile device component 120 to facilitate determinations relating to the appropriateness of remote utility components 110 for fulfilling the needs of the mobile device user. For example, where a fuel sensor in a vehicle functions as an information source component 130 for a user's mobile device 120, the fuel sensor can provide data to the mobile device 120 that the vehicle is low on fuel. This information can then be analyzed by the mobile device 120 to determine that a mapping remote utility with gas station information can be an appropriate remote utility component 110 to make available to the user of the mobile device 120. This can be done in an automatic manner, such that the user of the mobile device 120 is not required search for the remote utility, rather the remote utility is presented to the user based on the context of the user.

Further, information source components 130 can communicate directly or indirectly with remote utility components 110 to facilitate determinations relating to the appropriateness of remote utility components 110 for fulfilling the needs of the mobile device user. For example, where an information source component 130 is a purchasing pattern information component, the information component can be aware that the user regularly purchases coffee on the way to work. Where an advertising remote utility component 110 is available for a plurality of coffee shops along the user's typical route to work, the purchasing pattern information source component 130, for example, can communicate with the advertising components to present the user's coffee purchasing history information to the advertising utilities such that the advertising remote utilities can be enabled to offer the user a customized special offer on coffee. The mobile device component 120 can then access the special offers presented to it by the advertising remote utilities 110, allowing the user to get the best deal on a good cup of coffee on their way to work.

Figure 2:
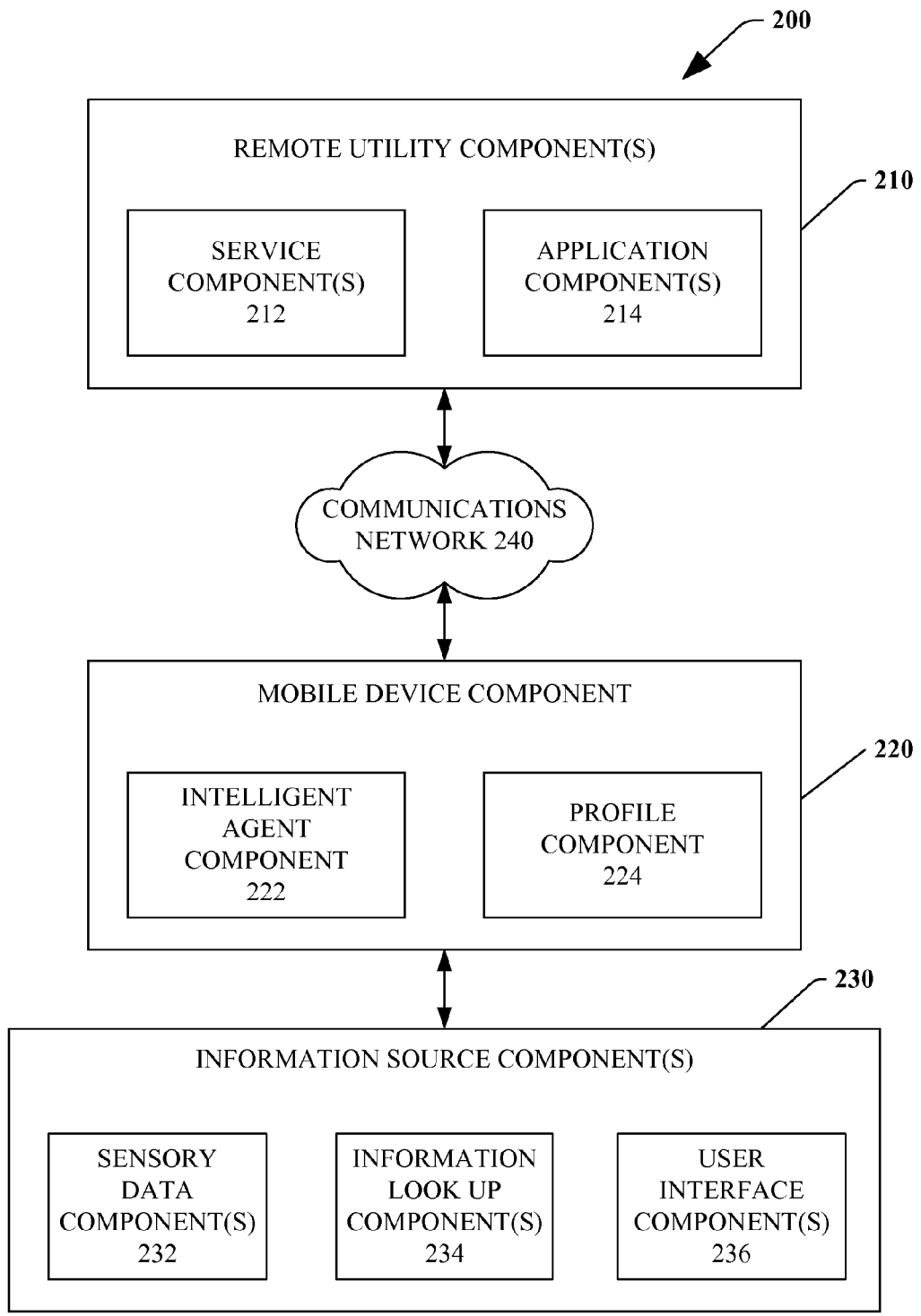
FIG. 2 is an illustration of exemplary components for a system in accordance with the subject invention.

FIG. 2 illustrates exemplary components for a system 200 in accordance with the subject invention. System 200 can include a remote utility component 210 that can be the same as, or similar to, remote utility component 110. Remote utility component 210 can include service components 212 and application components 214. Service components 210 can include providing content or other information, processing of information, accessing of information, or storage of information as a service, or combinations thereof. For example, a service component 212 can be an dictionary service, a rental car reservation service, a phone number lookup service, a stock ticker content provider, a traffic information provider, or a nearly limitless number of other types of services and content that can be provided to a mobile device. An application component 214 can include making an application available to a mobile device, for example, a downloadable PIM, downloadable ring tone creators, downloadable voice recorder applications, downloadable restaurant guide applications, or a nearly limitless number of other downloadable applications for a mobile device.

System 200 can further include a mobile device component 220 that can be the same as, or similar to, mobile device component 120. The mobile device component 220 can further include an intelligent agent component 222. The intelligent agent component 222 can facilitate determining appropriate remote utility components 210 to fulfill a mobile device user's needs. The intelligent agent component 222 can selectively expose relevant functionality respecting content, services and applications available for the mobile device, hiding the details, learning the habits of the user, and predicting possible future actions of the user, in order to make suggestions or to initiate actions to facilitate more optimized user interactions with remote utilities. The intelligent agent component 222 allows the mobile device component 220 to learn from the user's behaviors. These behaviors can suggest patterns related to the user that can facilitate predictive determinations or inferences about what the user will do in a current or future context. For example, where a user regularly accesses news content between 6 a.m. and 7 a.m., the intelligent agent component 222 can learn that this is a user pattern and can use this information to predict that the user will access news content on the mobile device the following morning. This inference can be leveraged to help sort through the numerous news content remote utilities available such that, for example, a news content remote utility that provides the timeliest news content information between 6 a.m. and 7 a.m. can be selected to provide the news content to the user on the mobile device. The intelligent agent component 222 can thus function as an inference engine to predict a user's needs by learning user habits and patterns and presenting the user with options based on this intelligent learning.

The mobile device component 220 can further include a profile component 224. The profile component 224 can store information relating to the user's historical contexts. The profile component 224 can thus serve as a repository of information that can be leveraged by the intelligent agent 222 when forming determinations or inferences relating to the user's habits and needs across a wide variety of contexts. The profile component 224 can be populated by user input, input from information source components 230, input from the intelligent agent component 222 itself, and/or input from other components of the mobile device in relation to interactions with remote utility components 210. For example, where an inference is made that the user will need news content between 6 a.m. and 7 a.m., based at least in part on historical information from the profile component 224, and the user accesses motion picture content instead, the profile component 224 can be updated by the intelligent agent component 222 with information relating to the possible development of a new usage pattern. As another example, the profile component 224 can be updated with GPS information from an information source component 230 as the user goes to work each morning. This information can be accessed from the profile component 224 by the intelligent agent component 222 and be employed in a determination that a "to do list" remote utility (e.g., the user has stored a to do list with a remote utility provider) should be brought to the users attention where there are errands to do on the list that are near to the user's regular route to work.

System 200 can further include an information source component 230 that can be the same as, or similar to, information source component 130. Information source components 230 can further include sensory data 232, information look up 234, and/or user interface 236 components. Sensory data components 232 can include a vast variety of sensors that can communicate directly or indirectly with a mobile device component 220. A sensor can communicate directly with a mobile device component 220 by wired or wireless communications. A sensor can communicate indirectly with a mobile device component 220 by passing information through another device or system in eventual communication with a mobile device component 220 or by providing information that is processed or manipulated to form at least part of some information then communicated to or made available to a mobile device component 220. For example, a sensory data component 232 can include a fuel sensor in a vehicle that can communicate either directly with a mobile device component 220 or indirectly by first passing the fuel information, for example, to the vehicle's computer where it can be included as a data entry on vehicle statistics made available to a mobile device component 220. As another example, a sensory data component can include a heart rate monitor, a temperature sensor, a GPS sensor, a camera, a microphone, facial recognition system, accelerometer, clock, or a nearly a limitless number of other sensors that can provide information to a mobile device directly or indirectly.

Information look up components 234 can include a similarly vast variety of information repositories where information can be accessed or presented to the mobile device component 220. Examples of information look up components 234 can include historical weather data, flight schedules, address books, documents, government records, tide charts, voice or audio records, video records, databases, or a nearly limitless number of other information stores. This information can be accessed or presented to a mobile device component 220. The intelligent agent component 222 can employ this information to assist in forming better predictions relating to the user of the mobile device and thereby facilitate better selection of remote utility components to make available to the user.

User interface components 236 can include a wide variety of interfaces that can receive information relating to the user of the mobile device. A user interface component 236 can include direct input components, such as, keypads, touch screens, voice recognition, image recognition, trackballs, mice, styluses, and other means of directly inputting user information. Further, a user interface can include information gathering devices and systems, such as biofeedback devices that, for example, can monitor the emotional state of a user. User information can be relayed to the intelligent agent component 222 of the mobile device component 220 to facilitate forming better predictions relating to the user. For example, where a user selects a preference for female news anchors, this can be factored into determinations made by the intelligent agent when selecting news content remote utilities to make available to the user on the mobile device. One of skill in the art will appreciate that a nearly limitless number of sensory data components 232, information look up components 234, and user interface components 236 can be employed to provide or allow access to information by a mobile device component 220 and that all such permutations are within the scope of the disclosed subject matter.

Figure 3:
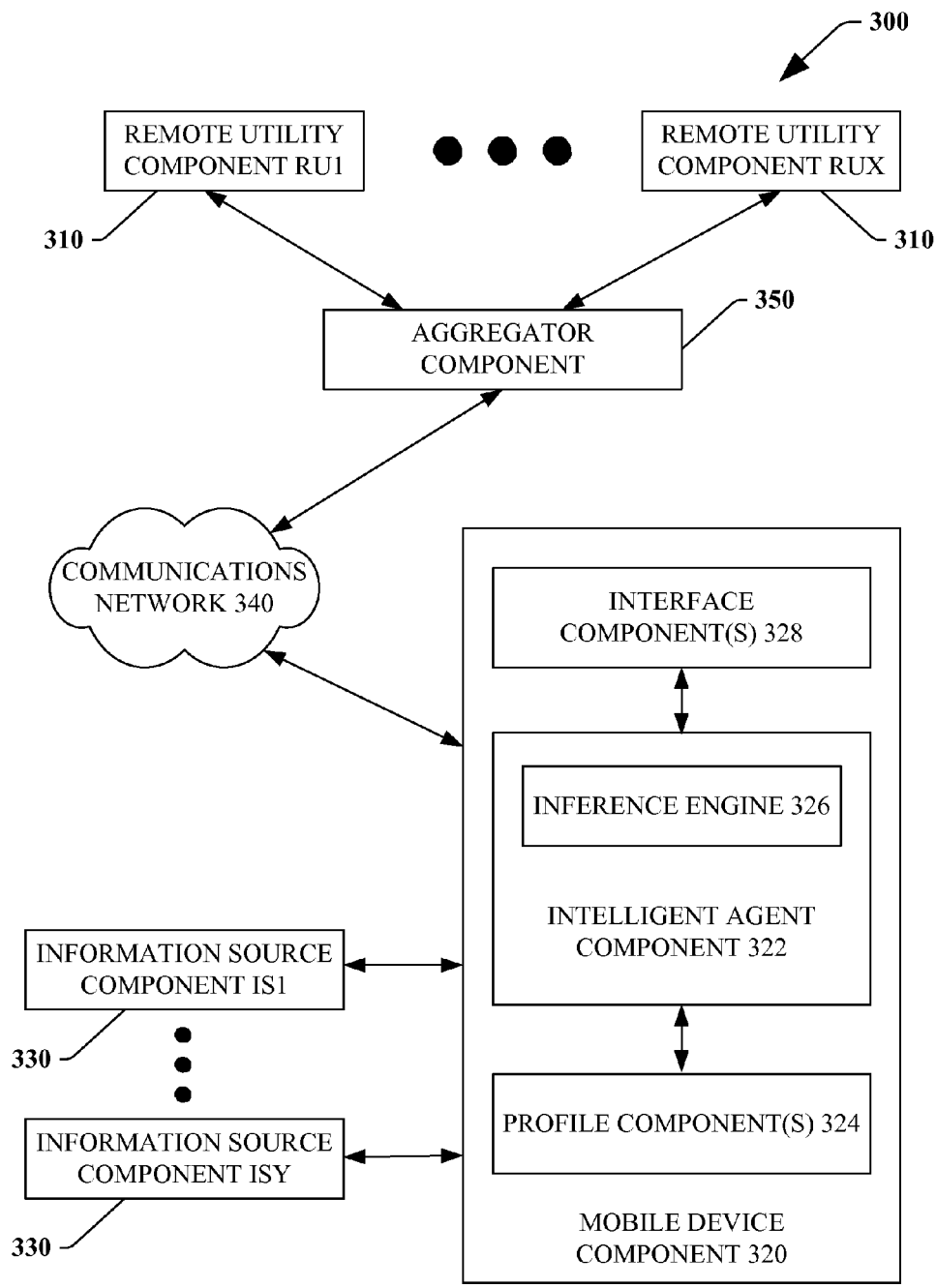
FIG. 3 is an illustration of an exemplary architecture for implementing an intelligent agent component for a mobile device component in accordance with the subject invention.

FIG. 3 illustrates an exemplary architecture 300 for implementing an intelligent agent component 322 for a mobile device component 320. Intelligent agent component 322 can be the same as, or similar to, intelligent agent component 222. Based on usage and patterns stored in a profile component 324 (which can be the same as, or similar to, profile component 224), and any other information source component 130 (which can be the same as, or similar to, information source component 130, 230) information IS1 to ISY (e.g., information, video, audio, body temperature, emotions, pictures, data, location, conditions, etc.), a portion of the intelligent agent component 322 can behave as an inference engine 326 for intelligently making a tailored set of remote utilities (e.g., services, applications, and/or content) available to the user based on what the user is likely to want to do in the future for the given context and conditions. These remote utilities can be represented as remote utility components 310 RU1 to RUX, which can be the same as, or similar to, remote utility components 110, 210. An interface component 328 can provide the user with an interface to the available remote utility components 310 selected by the intelligent agent 322.

Accordingly, once the next set of likely actions for the user are determined, intelligent agent component 322 can communicate with one or more communications networks 340 on behalf of the user to make a relevant set of remote utility components 310 RU1 to RUX, which may be distributed and numerous, readily available to the user on mobile device component 320. In this way, a user can be lead to a likely set of future actions, and the service infrastructure is already made available to the user, either by choice of the user, or automatically where a future action is deterministic based on previous actions. In addition, where the user is likely to seek certain information as a future action, the inference engine 326 can infer information that the user will want to know in the future, or actions the user will want to take, and automatically pre-fetch that information, or any other content, service and/or application, required to complete an action, so that the mobile device 320 is ready when such information is needed or such actions are taken. An aggregator component 350 may optionally act as an intermediary for distributed remote utility components 310 RU1 to RUX so that the mobile device 320 can operate independent of service requirements and interact with aggregator component 350 which hides the details and protocols associated with distributed remote utility components 310 RU1 to RUX.

Figure 4:
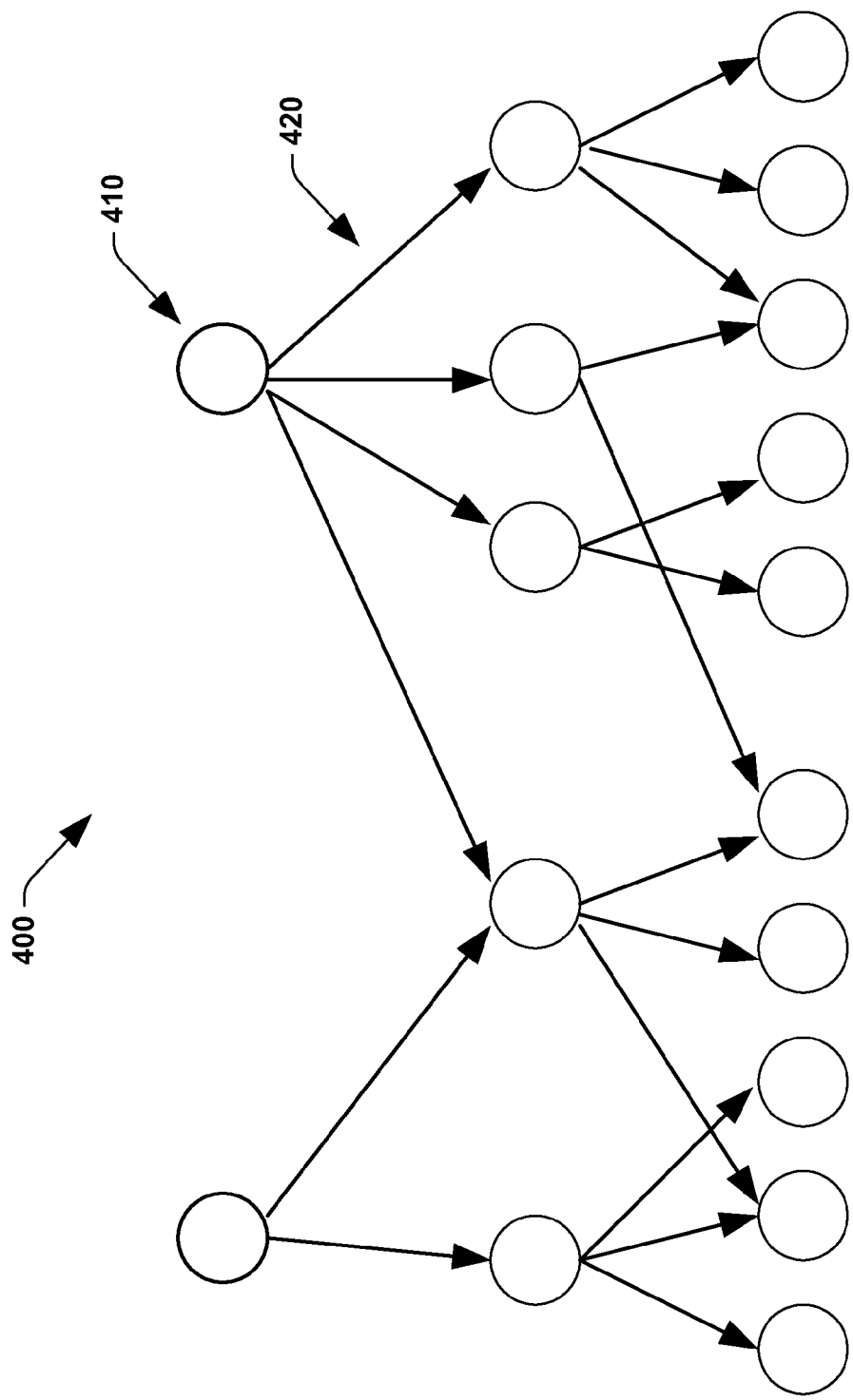
FIG. 4 illustrates an exemplary belief network in accordance with the subject invention.

FIG. 4 illustrates a representative belief network 400 that can be used to model uncertainty in a domain in connection with the subject invention. The term "belief networks" as employed herein is intended to encompass a whole range of different but related techniques which deal with reasoning under uncertainty. Both quantitative (mainly using Bayesian probabilistic methods) and qualitative techniques can be used. Influence diagrams are an extension to belief networks; they are used when working with decision-making. Belief networks are employed to develop knowledge based applications in domains, which are characterized by inherent uncertainty. A problem domain is modeled as a set of nodes 410 interconnected with arcs 420 to form a directed acyclic graph as shown in FIG. 4. Each node represents a random variable, or uncertain quantity, which can take two or more possible values. The arcs 420 signify the existence of direct influences between the linked variables, and the strength of each influence is quantified by a forward conditional probability.

Within the belief network the belief of each node (the node's conditional probability) is calculated based on observed evidence. Various methods have been developed for evaluating node beliefs and for performing probabilistic inference. The various schemes are essentially the same—they provide a mechanism to propagate uncertainty in the belief network, and a formalism to combine evidence to determine the belief in a node. Influence diagrams, which are an extension of belief networks, provide facilities for structuring the goals of the diagnosis and for ascertaining the value (the influence) that given information will have when determining a diagnosis. In influence diagrams, there are three types of node: chance nodes, which correspond to the nodes in Bayesian belief networks; utility nodes, which represent the utilities of decisions; and decision nodes, which represent decisions which can be taken to influence the state of the world. Influence diagrams are useful in real world applications where there is often a cost, both in terms of time and money, in obtaining information.

An expectation maximization (EM) algorithm is a common approach for learning in belief networks. In its standard form it does not calculate the full posterior probability distribution of the parameters, but rather focuses in on maximum a posteriori parameter values. The EM algorithm works by taking an iterative approach to inference learning. In the first step, called the E step, the EM algorithm performs inference in the belief network for each of the datum in the dataset. This allows the information from the data to be used, and various necessary statistics S to be calculated from the resulting posterior probabilities. Then in the M step, parameters are chosen to maximize the log posterior log P(T|D,S) given these statistics are fixed. The result is a new set of parameters, with the statistics S which we collected are no longer accurate. Hence the E step must be repeated, then the M step and so on. At each stage the EM algorithm guarantees that the posterior probability must increase. Hence it eventually converges to a local maxima of the log posterior.

As applied in the context of the subject innovation, the belief network can represent potential future actions by the mobile device user and probabilities can be determined for each successive layer of potential future actions. Thus, the belief network can function to predict more probable user actions and correspondingly can determine more optimal selections of remote utilities to make available to the user of the mobile device. Where the intelligent agent (e.g., 222 and 322) traverses the belief network, the intelligent agent can learn the behavioral patterns of the user and can form inferences regarding expected future user behaviors. These predictions can be employed to more accurately select content, services and/or applications to make available to the user and can further facilitate pre-fetching of this content, services and/or applications to make the user's interaction with them as seamless as possible. Moreover, where mobile device memories are becoming voluminous, more information can be pre-fetched and stored to allow for more uncertainty in the predictions of user behaviors while maintaining a more seamless user experience.

Figure 5:
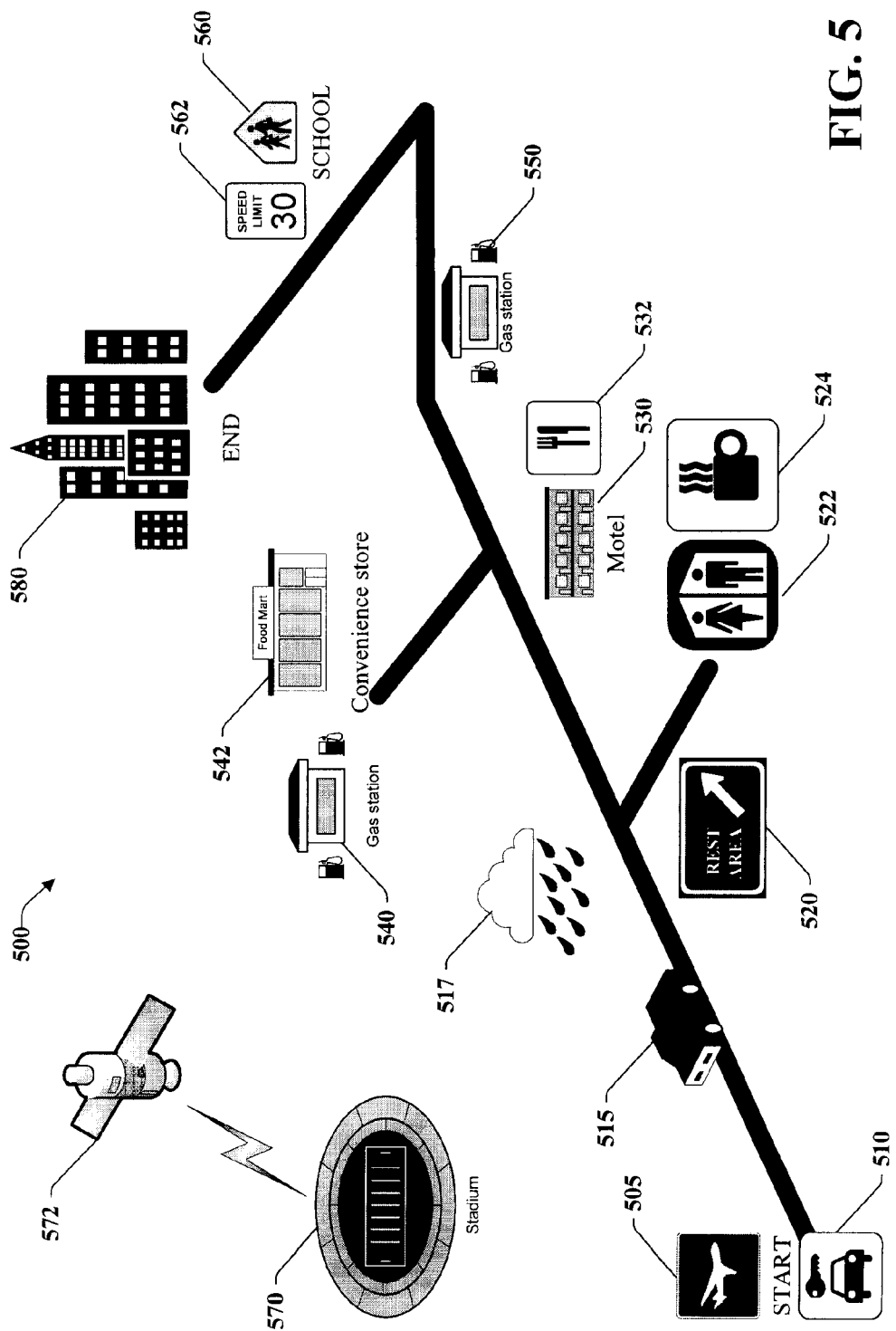
FIG. 5 is a schematic diagram illustrating a non-limiting exemplary scenario according to an aspect of the invention.

FIG. 5 is a schematic diagram illustrating a non-limiting exemplary scenario according to an aspect of the invention. A user with a mobile device as herein described can arrive at airport 505. The intelligent agent in the mobile device can already have formed inferences based on the imminent arrival at airport 505 such that as the user gathers his baggage the intelligent agent can already have pre-fetched a mapping remote utility. The intelligent agent can also have populated the mapping remote utility with the location of the user's prescheduled rental car pickup (e.g., by accessing the user's itinerary as an information source) such that as the user accesses the mobile device the user is presented with the option of displaying the map to the rental car counter 510. As the user is renting their car at 510, the intelligent agent can determine that based on the historical use of the mobile device (e.g., accessing the profile store as an information source) the user typically downloads a map to their destination and can pre-select a set of mapping application remote utilities appropriate for this purpose as well as pre-fetching the relevant sets of maps for each selected mapping application such that when the user selects their preferred mapping application the map is ready to be displayed.

As the user begins the trip in car 515, getting underway quickly thanks to the mapping application and map being at the ready, the intelligent agent can source information from information sources in the car 515. This information can include, for example, accessing the average fuel economy, the amount of fuel in the vehicle, and any mechanical issues that are flagged by the car's computer. Similarly, for example, the intelligent agent can determine current weather conditions by accessing a weather information source, traffic conditions along the planned route (e.g., accessing a traffic information source and the map route selected by the user on the mobile device), and can determine what local radio stations are available (e.g., scanning the broadcast radio stations as an information source, especially if there are radio stations that embed broadcast information in their radio signal that can provide additional information about the stations), among other useful information sources. The intelligent agent can then present the user with access to the information through the mobile device or can present the user with remote utilities related to the user's desires and the information sources gathered. For example, a remote utility can be available that will allow the mobile device to communicate with the cars computer to preset radio stations, where this is selected by the user, the radio stations in the car can be preset according to user preferences as they map to the local radio station context (e.g., signal strength, music style, . . . ).

Once the user is on the road heading towards their destination, the intelligent agent can begin pre-fetching large visual files that will be needed at the destination. Thereby the intelligent agent can potentially access this information more efficiently (e.g., by pre-fetching the download at a lower bandwidth that can cost less as compared to needing higher bandwidth for a shorter time to complete a faster download of the files once the user is already at the destination). The user can also be notified of approaching bad weather 517 well in advance to allow the user to plan accordingly.

As the user passes the time on the road, health sensors can act as information sources to pass information to the intelligent agent that the user is becoming restless. These health sensors can include heart rate monitors, biofeedback sensors measuring stress, breathing sensors, blood pressure sensors, or other health or emotional state sensors. In response, the intelligent agent can infer, based on the amount of time the user has been driving and the approach of bad weather 517, that the user can benefit from a rest. The intelligent agent can then seek out information relating to available rest stops along the route and can populate the selected mapping remote utility application already downloaded and running on the mobile device with this new information set. Thus, the user can be notified of approaching rest stop 520 and the availability of restrooms 522 and coffee 524 available there.

After the user has taken some time to refresh themselves and has resumed their journey, the intelligent agent can determine that the user may want to eat and can begin accessing remote utilities indicating food along the route. The intelligent agent can then inform the user of motel 530 having food 532 available near the route and of gas station 540 having a convenience store 542 further along but more off the route. In addition, the intelligent agent can source the menu of the motel's diner 532 such that if the user desires they can view the menu. Moreover, the intelligent agent can pre-fetch information about the caloric content of the menu items in response to a user's established historical pattern of seeking this information out. Further, the intelligent agent can check for information sources that can indicate the relative safety of the food provided (e.g., by sourcing health department records, newspaper reviews of the diner, . . . ). This information can be presented to the user upon request or as a warning if such is indicated.

Where the user selects to bypass the motel 530 and diner 532 in favor of making better time, the intelligent agent can inform the user that convenience store 542 can be the last food stop until the destination. Further, where the user may need to refuel the vehicle 515, the intelligent agent can seek out remote utilities that compare fuel costs. The intelligent agent can populate the fueling remote utility and gather fuel cost information therefrom to present to the user. Where fuel at gas station 550 is more expensive that at gas station 540, the user can be notified that eating at convenience store 542 and refueling at station 540 can save time over making two stops. Where the user determines that they don't want to eat at gas station, the intelligent agent can query the user about setting dinner reservations at the destination.

Where the user opts to set dinner reservations at the destination, the intelligent agent can seek out information sources for the user's preferred foods near the destination and present the user with a selection of available places to eat. The user can then elect to set reservations. The intelligent agent can determine an estimated time of arrival and can forward a request for reservations at an appropriate time. As the user stops for fuel at gas station 550, the intelligent agent can continue to access traffic information sources and can determine that the road ahead is unusually clear, such that the user can arrive at their destination earlier than expected. The intelligent agent can then suggest moving the dinner reservation up to the new arrival time.

As the user resumes the journey after fueling at station 550, the intelligent agent can determine that the user is historically a "fast driver" and that they regularly exceed the posted speed limits (e.g., accessing the users profile store and comparing previous driving speeds with the corresponding posted speed limits). The intelligent agent can further gather data suggesting that there is a school 560 ahead and that there are often speed traps located there because the posted speed limit drops to 30 M.P.H. 562 near the school (e.g., accessing news stories as information sources describing the regular speed traps posted near the school). The user can be warned about the potential for speed traps and the possibility of children near the school 560.

As the user cautiously passes the school zone and successfully avoids the speed trap there, a sporting event at stadium 570 can be occurring. Because the sporting event involves the user's home team, the intelligent agent can infer that the user will want occasional updates of the score and can want to watch the entire event that evening. The intelligent agent can seek out remote utilities to provide score updates and pre-fetch the updates and the televised broadcast. Then, as the user requests the update information they can be presented to the user (e.g., presenting upon only request can be a preference of the user that helps the user avoid having the game spoiled by getting too much information, such as a final score, before the user can watch the event that is being pre-fetched for later viewing).

As the user arrives at destination 580, the intelligent agent can select to update a call-forwarding feature of the mobile device that can allow incoming calls to automatically be first routed to the user's hotel room before ringing on the mobile device based on the user's historical preferences and the room phone numbers sourced from the hotel server. Further, a map can be provided to the restaurant where the dinner reservations were made. Additionally, the pre-fetching of the large files can complete because the download rate was selected to complete the entire download in the estimated travel time from airport 505 to destination 580. These files are now instantly available to the user without the user ever having had to specifically initiate the download. As the user heads off to dinner, the intelligent agent can continue by pre-fetching the caloric information for the available menu at the selected restaurant because there is a high probability that will be beneficial to the user.

This example is presented in as a non-limiting illustration of just some of the numerous possibilities of employing an intelligent agent acting in part as an inference engine in concert with numerous remote utilities and information sources to the benefit of a mobile device user. One of skill in the art will appreciate that this and numerous other permutations of the given example and/or other possible examples are well within the spirit of the herein disclosed invention and that all of these are to be considered within the scope of the subject innovation.

As mentioned, the invention can pre-fetch data for a predictive swath of services based on the analysis of the intelligent agent. In this regard, the intelligent personal agent of the mobile device actively communicates to pre-fetch data that is likely to be relevant to the user so that it is already available on the mobile device when asked for by the user (e.g., pre-fetching of menus, pre-fetching the large data file, . . . ). As a simple example, based on usage history, the intelligent may determine that when the user opens up the user's contacts to a particular contact, the user calls that contact next 92% of the time. With such a high predictability, the intelligent agent can automatically offer to make a call to the predicted party. As another simple example, the intelligent agent may determine that the user checks the ESPN sports page scores on-line 60% of the time when driving north on a particular Interstate highway. In such case, the intelligent agent can pre-fetch the information of interest so that the user does not need to wait for a download of the data.

With ever advancing memory limits on portable devices, the ability to pre-fetch and store content on behalf of a user where the content is known to be, or likely to be relevant, can be advantageous to a user. The local content can be deleted as it becomes out of date, or versioned, where desirable, such as may be for Web site content (e.g., the intelligent agent continuously updating the traffic information in FIG. 5). In one embodiment, a user research engine is processing in the background of the device, e.g., to automatically pre-fetch and inform a user about a restaurant menu when the user has recently run a query on the restaurant. As information becomes outdated, a user can be made aware of updates received by the mobile device (e.g., score updates as a game progresses).

For other examples, with the intelligent agent of the invention, the mobile device can be calling, SMSing, making Web requests, and gathering data, content, applications and/or services that are all relevant to the user and what is predicted for the user next. Knowing about the user's personal profile, over time, the mobile device is collecting and filtering information that is relevant to the user in a way that is seamless to the user experience, (e.g., the user performs an action, and the necessary data is present). To intelligently learn about the user for purposes of pre-fetching and filtering data retrieved by the mobile device, the mobile device can track usage patterns, settings, daily life usage of the communications capabilities of the device, user schedule, personal data, sensor data, etc. As a result, the mobile device can become a manager for personal information, products, content and/or services on behalf of the user. Bayesian prediction algorithms that weight data that is more recent in time over data older in time may be used to predict the future.

In sum, the invention provides an intelligent agent that is smart enough to present smart actions for the user, manage information for the user, send and receive information to and from appropriate network locations, automatically organizing the user's life, and the like, while continuing to learn what the user wants and needs for an improved user experience over time. As the mobile device learns more about the user, it can automatically and selectively expose a better subset of functionality and services to the user over time (e.g., selecting restaurants at which to set reservations based on the user's food preferences, . . . ). The mobile device is thus trained based on user habits and usage history rather than forcing tedious entry of user preferences in advance, which may or may not map well to choices of interest to a particular user.

The intelligent agent may also extract demographic information, purchasing patterns, communication patterns, device usage history, location information and/or body or environmental sensor information to identify key potential customers. For instance, within a block of a Starbucks coffee house, Starbucks advertising turns up at the mobile device which has learned that first thing in the morning, the user of the mobile device enjoys coffee between 8 a.m. and 8:30 a.m. This can occur in one aspect by information sources pertaining to the user communicating directly or indirectly with remote utilities (e.g., adverting utilities, . . . ) such that, for example, the advertising utilities can present customized utilities to the intelligent agent (e.g., improving the probability that the remote utility will benefit the user). In another aspect, remote utilities can request that the intelligent agent communicate user specific information to facilitate customization of the remote utility to the user's needs.

Given the potential for pernicious use of private information, and a general desire by most people not to be bothered by unwanted advertising, an opt-in model can be adopted to publish information about oneself. In one embodiment, a user of the mobile device receives a percentage of the cost of the advertising, (e.g., instead of all the money going to the publisher and/or advertiser as in more conventional systems), a user could receive a percentage of advertising revenue, e.g., as credit or deposited to a user account that accrues over time as a tradeoff for the intrusiveness of potential advertising.

Figure 6:
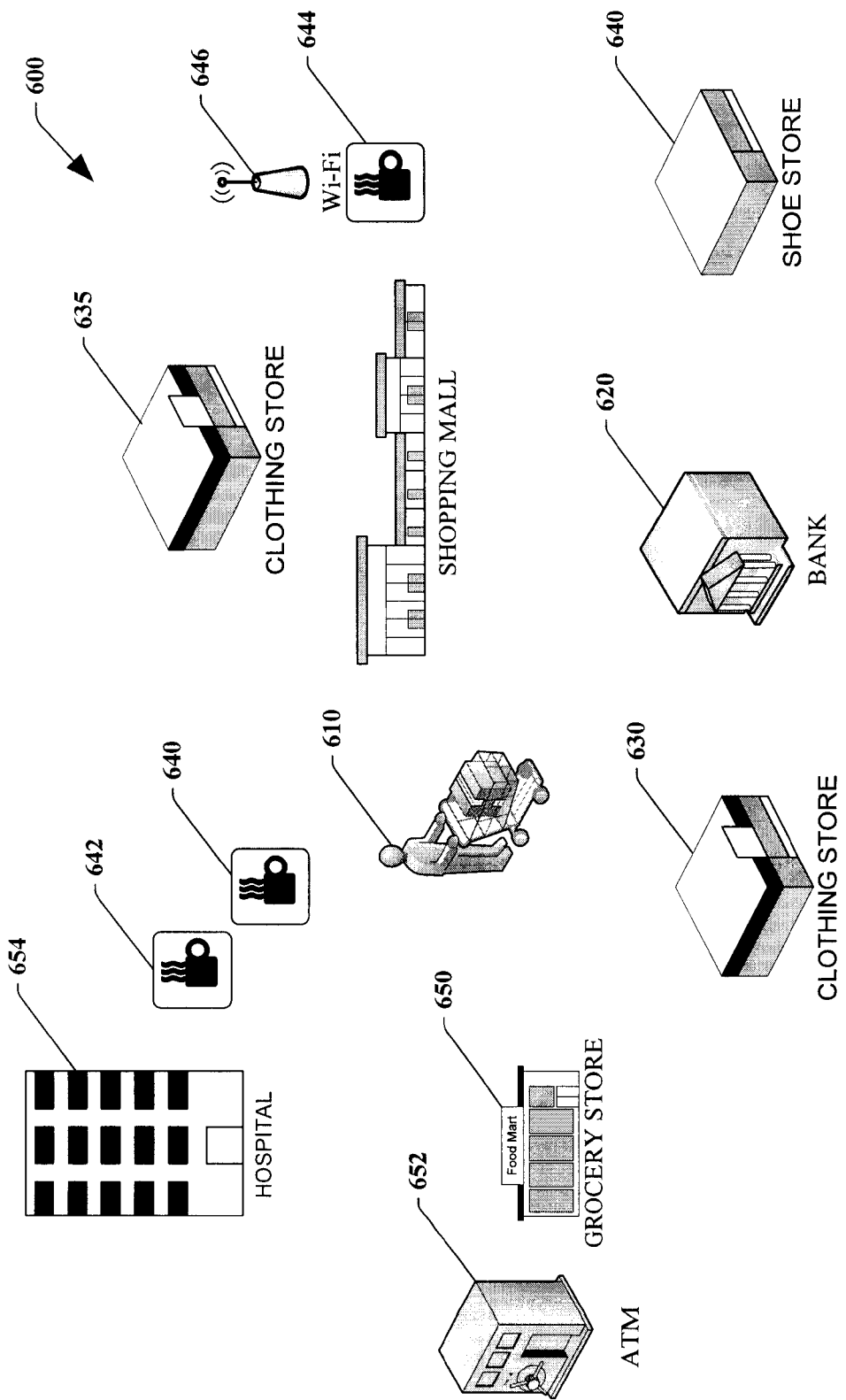
FIG. 6 is a schematic diagram illustrating a non-limiting exemplary scenario according to an aspect of the invention.

FIG. 6 is a schematic diagram illustrating a non-limiting exemplary scenario according to an aspect of the invention. In one embodiment, a wireless mesh network is implemented where there are no network providers (e.g., Verizon, Sprint, T-mobile, . . . ). In such a mesh network, products and services are numerous and distributed, making it difficult for users to navigate the expansive sea of services when generally only a small subset of services are needed or wanted at a given time. For instance, it is not difficult to imagine thousands of information, communication, action, communication and management services being broadcast or transmitted, or being made otherwise available, to mobile devices at a given time. These remote utilities can be filtered directly by an intelligent agent or can be pooled in aggregation components to provide a clearinghouse of sorts for the overwhelming number of remote utilities that can be more efficient, as herein discussed, than directly filtering with an intelligent agent.

A user 610 with a mobile device as herein described can be out for a day of shopping. The user 610 can begin near a bank 620 after finding a great parking spot. The intelligent agent of the mobile device can infer that the user has sufficient funds for a typical shopping day (e.g., based on historical shopping trips to this neighborhood and the user's last cash withdrawal and spending habits). The user can be notified of a sale at a clothing store 630 that they frequent and be offered a special discount to entice them to come in and shop (e.g., the intelligent agent communicates with an advertising remote utility of the clothing store 630 and can forward shopping histories and preferences to the advertising utility based on the user opting in to this type of information sharing). The intelligent agent can also begin pre-fetching inventories, sale information, and maps to various stores that can be relevant to the user based on shopping history, grocery items in the refrigerator at home, items of interest based on recent web searches, etc.

For example, where the user has repeatedly viewed a particular pair of high-end shoes online, the user can be informed that those shoes have just arrived at shoe store 640. Thus, user 610 can bypass clothing store 630 and head straight to the shoe store to see the shoes in person. Based in part on the user 610 moving into the shoe store 640, the intelligent agent can seek out price comparison remote utilities and populate them with the predicted shoe of interest such that as the user 610 finds the shoe in the shoe store 640, they can be presented with prices for the same product at other locations. Where the user is being informed of these competitive prices, a remote utility in the shoe store 640 can be informed that better prices exist at other locations and in response can inform the intelligent agent that the shoe store 640 will match these prices, which information can be presented to the user 610. The user 610 can decide that this is the right time to purchase the shoes because the shoe store 640 will price match and the user has had a high interest in the shoes for some time. Upon purchasing the shoes, the intelligent agent can receive updated bank account information from the user's bank information source. This information can be processed such that the intelligent agent can inform advertising utilities of what the user 610 has purchased, that the user is in a spending mood and also has already begun to deplete the likely amount the user 610 will spend that day. In response to this broadcast information, the advertising remote utility at clothing store 630 can inform the intelligent agent of clothing that can go well with the newly purchased shoes. Further, the advertising utility can offer a steep discount to entice the user 610 back to the clothing store 630 (e.g., because the advertising agent at the clothing store 630 is aware the user 610 has already bypassed them a first time that day).

The user 610 can then proceed to the clothing store 630 to purchase some of the clothes offered at the great discount. An advertising utility at clothing store 635 can desire to entice the user 610 to shop at their store and can offer a greater discount to the user for the same or similar clothing that would go well with the user's new shoes. However, the intelligent agent can predict that the additional discount is unlikely (based on the user's historic shopping patterns) to entice the user 610 to travel the extra distance to clothing store 635 and can select not to include the information from clothing store 635 in notices to the user 610. In one embodiment of the subject innovation, the exchange of information for advertising purposes (among other purposes) can result in additional discounts for sharing user information or can earn a user 610 an advertising revenue in exchange for releasing the user's information.

After the user 610 has purchased some clothing at clothing store 630, the user 610 can decide they would like to have a cup of coffee. The intelligent agent can fetch information relating to coffee shop amenities for the user as the user begins searching for coffee shops on the mobile device. The user can be informed of coffee shops 640 (e.g., the closest coffee), 642 (e.g., a favorite coffee shop of the user based on historical data), and shop 644 having Wi-Fi access 646. User 610 can select to have coffee at shop 644 based in part on the information that Wi-Fi is available there allowing her to surf the Web at a cheaper rate that perhaps is currently offered for the mobile device. This information can be passed to the current mobile device service provider. In response, the current mobile device service provider can offer to provide Web access at competitive rates with Wi-Fi hotspot 646. In an embodiment, this can be performed as an auction-type offering for services, content, and/or applications (e.g., for remote utilities that would incur fees for the user, the user can offer to purchase these utilities from a low cost provider meeting the user's requirements for the quality of the utility). Where other mobile device service providers are available, they can compete for the user's web access as well. In the end, the user 610 can decide to forego the trip around the shopping mall to the Wi-Fi hot spot 646 because a similarly expensive mobile device service provider has bid low enough that the trip to 646 is not worth the savings to the user 610. The user can then select to have coffee at her favorite coffee shop 642.

As the user proceeds towards coffee shop 642, the user can be notified by the intelligent agent that her larder at home indicates that pasta and bread should be purchased (e.g., the user's larder can act as an information source) and that grocery store 650 has a sale on the usual bread and pasta the user 610 prefers. The user 610 can detour to the grocery store 650 to purchase the items. As user 610 stands in line to purchase the bread and pasta, the intelligent agent can infer that the user 610 can be low on cash because of her recent purchases. The intelligent agent can also infer that the small purchase of coffee predicted to happen at shop 642 is better done in cash to avoid a charge associated with non-cash purchases that is levied by shop 642. The intelligent agent can inform the user 610 that they should make use of ATM 652 to withdraw some cash for coffee shop 642.

When user 610 goes to use the ATM 652 they can realize that their debit card is missing and can call the bank to inform them of the missing card. The intelligent agent can infer based on the call to the bank at the time of the attempted withdrawal at the ATM 652 that the card can be missing and can provide the user with the option of calling the last location where the debit card was used to see if it was left there. The user can then conference in the manager at the last place the card was used to the phone call with the bank. Where the manager at the last store does not have the card, the intelligent agent can notify stores visited between the last use and the current location of the missing card and provide those stores with a means to contact the user 610 if the card is found there (e.g., the intelligent agent can infer that the card can have fallen out when the user 610 was accessing their wallet for purchases in the interim stores). The bank manager can put a temporary hold on the card in case the card is found and returned. Where the card is not located in a predetermined period of time, the intelligent agent can inform the bank to cancel the lost card and issue a new card without requiring the user to take any further action.

As the user proceeds to coffee shop 642, the stress of the lost debit card can cause user 610 to have elevated blood pressure. This elevated blood pressure can be communicated to the intelligent agent from health sensors acting as information sources. The intelligent agent can then suggest that the user 610 visit hospital 654 to have their health monitored by a doctor. When user 610 enters the hospital, numerous local remote utilities can be available to the user 610. These utilities can be aggregated into a library of utilities that the intelligent agent can access. These remote utilities can include doctor information, health monitoring utilities, prescription discounts, and drug information utilities, among numerous other remote utilities. The intelligent agent can select a doctor from the information provided and by accessing the user's health history. Further, the intelligent agent can pre-fetch informational video content about managing stress that the user can watch as they wait for the selected doctor. Moreover, the intelligent agent can begin to compare the costs of various typical stress medicines at the hospital and other locations, such that if typical medications are suggested, a best price can be obtained for the medication.

Where the doctor merely states that the user should take some time to relax and should avoid caffeine, the user can proceed to the coffee shop 642 and order steamed milk rather than coffee. The user can relax at the coffee shop and the intelligent agent can inform the user when their blood pressure returns to a normal level.

The intelligent agent (e.g., with or without an aggregation component in the system) thus provides the ability to dynamically select services based on high value, high quality and/or high probability propositions for given users. The intelligent agent, at a high level, provides the best and most relevant results for a given query for services, much like an intelligent search engine function helping a user retrieve the most relevant results. Any one or more known ranking algorithms, such as the Page rank algorithm, can also be applied to the myriad of services available to help the user retrieve a quality set of relevant services for a given context.

In another embodiment, a dynamic auction-based model is proposed for services where as a user of the mobile device traverses time and space, and performs various actions, the user will generate different user contexts for the mobile device. Based on these user contexts, the mobile device will seamlessly negotiate a set of services from the overall set of services that apply to the user. A service aggregator function can be applied either in the mobile device itself, or as a network service aggregator that aggregates services from multiple different service providers, so that a negotiation to service providers is made seamless to the user of the mobile device via the service aggregator.

This can enable an on demand service use scenario where the user is able to dynamically move among service providers and shift from service to service, both horizontally (e.g., between similar service) and vertically (e.g., between lower end and higher end services). From the standpoint of the user of the mobile device, the device automatically switches from one provider to another based on availability, quality of service, best value, etc. The user merely sees the result of such predictive actions by way of a simple user interface that hides the multiplicity of services that are likely to be irrelevant to the user. The intelligent agent can manage a variety of subscription based or non-subscription based services, negotiating the contracts on behalf of the user as the user requires or is likely to require use of the services.

FIGS. 7-11 illustrate methodologies, flow diagrams, and/or timing diagrams in accordance with the disclosed subject matter. It is to be appreciated that the methodologies presented herein can incorporate actions pertaining to a neural network, an expert system, a fuzzy logic system, and/or a data fusion component, or a combination of these, which can generate diagnostics indicative of the optimization of remote utilities germane to the disclosed methodologies. Further, the prognostic analysis of data can serve to better optimize remote utility selection, and can be based on real time acquired data or historical data within a methodology or from components related to a methodology herein disclosed, among others. It is to be appreciated that the subject invention can employ highly sophisticated diagnostic and prognostic data gathering, generation and analysis techniques, and such should not be confused with trivial techniques.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states by way of a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
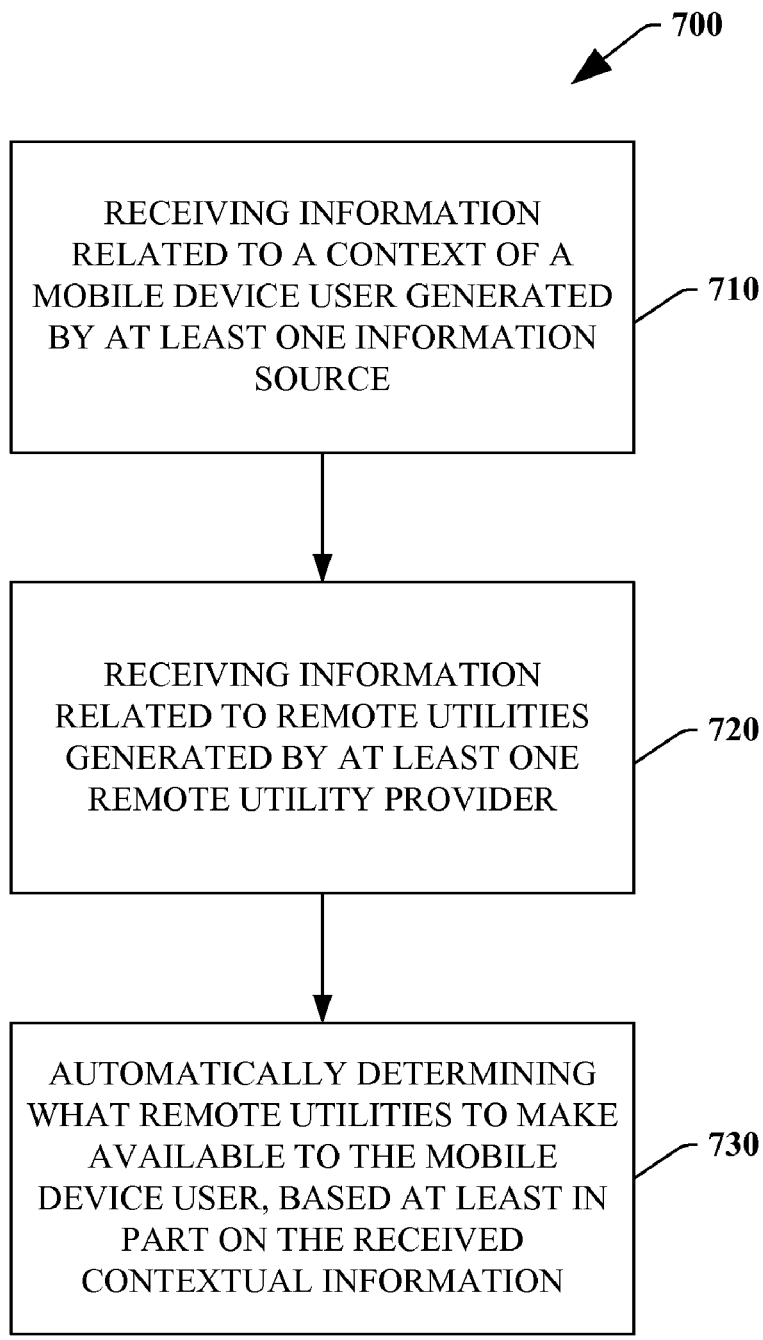
FIG. 7 illustrates a methodology that facilitates automatically determining what remote utilities to make available to a user in accordance with an aspect of the disclosed subject matter.

FIG. 7 illustrates a methodology 700 that facilitates automatically determining what remote utilities to make available to a user in accordance with an aspect of the disclosed subject matter. At 710, information related to a context of the mobile device user can be received. This information can be generated by information sources as described herein. The information can be related to various contextual aspects of the mobile device user, such as location, environmental conditions, video, audio, health sensor information, pictures, data, location conditions, emotional state information, among a nearly limitless number of other contextual aspects as herein described. One of skill in the art will appreciate that the vast number of information sources can provide additional depth and accuracy to any prognostic analysis or deterministic analysis of the user's context and that all such information sources are considered within the scope of the subject innovation.

At 720, information can be received relating to remote utilities. The information relating to the remote utilities can be generated by the remote utilities, remote utility providers, or aggregators as herein described. The information relating to the remote utilities can be nearly limitless and will be appreciated by one of skill in the art to add substantial value and accuracy to any prognostic or deterministic analysis of what remote utilities should be made available to a mobile device user and that all such remote utility information is to be considered within the scope of the subject innovation.

At 730, an automatic determination can be made regarding what remote utilities are to be made available to the mobile device user. This determination can be based, at least in part, on the received contextual information. The determination can further be based on information relating to remote utilities. Moreover, the determination can include purely deterministic analysis, inferential analysis, or combinations thereof At this point methodology 700 can end.

As described herein in detail, where a mobile device in accordance with the disclosed subject matter receives information from information sources relative to the context of the mobile device user, the mobile device (e.g., by way of an intelligent agent, an inference engine, . . . ) can form determinations or inferences regarding more optimal remote utilities to make available to the mobile device user. For example, where a user regularly access traffic information on a mobile device on the way to work, the mobile device can infer that the user will continue to access traffic information of the way to work in the future. Based on his inference, it can be automatically determined that the user should be given access to a local traffic content provider.

Further, where memories on mobile devices are growing increasingly large, a mobile device can determine that prefetching of information, services, and/or applications is appropriate to provide a more seamless user experience, as discussed herein at length. Moreover, an intelligent agent can employ information received from remote utilities or providers, to negotiate access to low cost, high quality remote utilities, also as herein discussed at length.

By empowering a mobile device with the ability to automatically determine what remote utilities are exposed to the user, the mobile device can act as a an intelligent agent that is smart enough to present smart actions for the user, manage information for the user, send and receive information to and from appropriate network locations, automatically organizing the user's life, and the like, while continuing to learn what the user wants and needs for an improved user experience over time. As the mobile device learns more about the user, it can automatically and selectively expose a better subset of functionality and services to the user over time. The mobile device is thus trained based on user habits and usage history rather than forcing tedious entry of user preferences in advance, which may or may not map well to choices of interest to a particular user.

Figure 8:
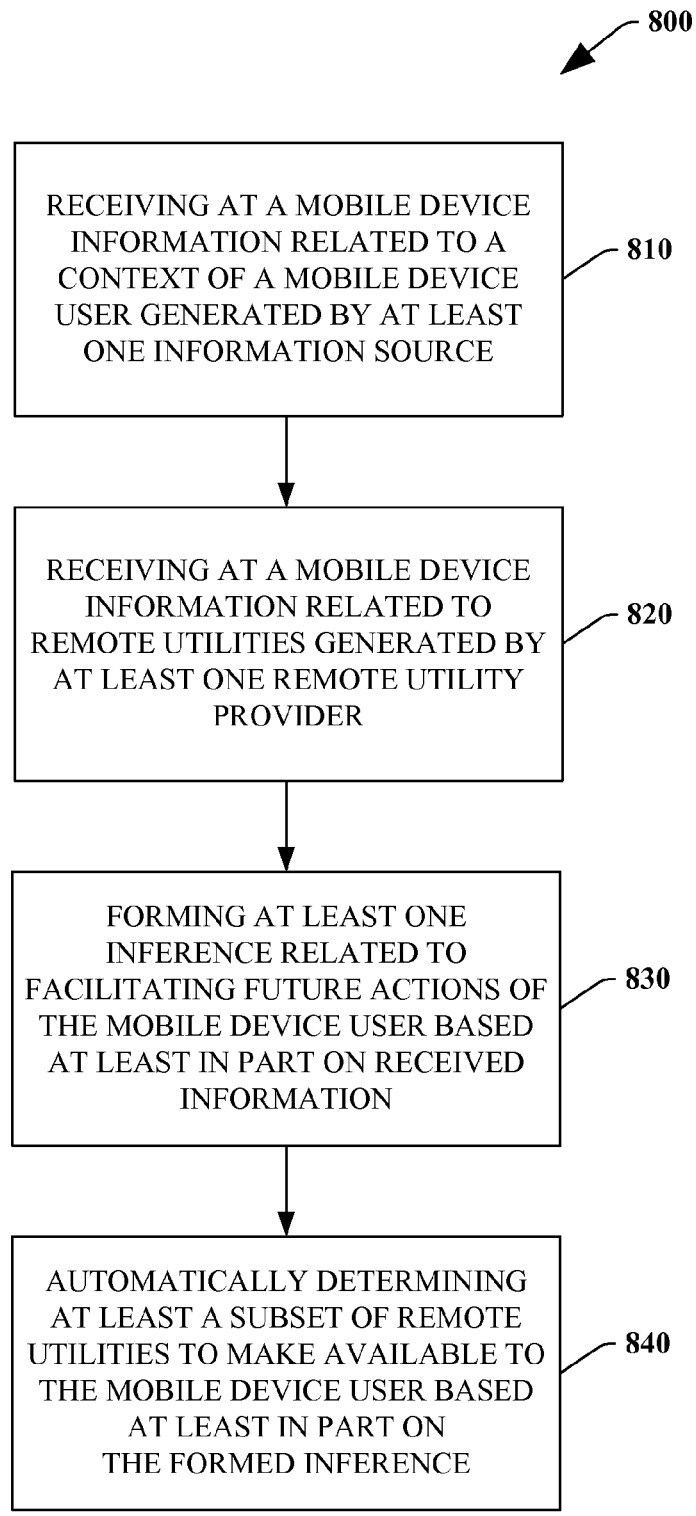
FIG. 8 illustrates a methodology that facilitates automatically determining what remote utilities to make available to a user in accordance with an aspect of the disclosed subject matter.

FIG. 8 illustrates a methodology 800 that facilitates automatically determining what remote utilities to make available to a user in accordance with an aspect of the disclosed subject matter. At 810, information related to a context of the mobile device user can be received. This information can be generated by information sources as described herein. The information can be related to various contextual aspects of the mobile device user, such as location, environmental conditions, video, audio, health sensor information, pictures, data, location conditions, emotional state information, among a nearly limitless number of other contextual aspects as herein described. One of skill in the art will appreciate that the vast number of information sources can provide additional depth and accuracy to any prognostic analysis or deterministic analysis of the user's context and that all such information sources are considered within the scope of the subject innovation.

At 820, information can be received relating to remote utilities. The information relating to the remote utilities can be generated by the remote utilities, remote utility providers, or aggregators as herein described. The information relating to the remote utilities can be nearly limitless and will be appreciated by one of skill in the art to add substantial value and accuracy to any prognostic or deterministic analysis of what remote utilities should be made available to a mobile device user and that all such remote utility information is to be considered within the scope of the subject innovation.

At 830, an inference can be formed relating to the future actions of a user. This inference can be based in part on information received from information sources and from utility components or providers. As discussed herein, an intelligent agent can function as an inference engine to formulate inferences based on information provided to the inference engine. Where this information is contextually rich, improved inferences can be formed. An inference relating to the future actions of a user can significantly affect what remote utilities are made available to the user of the mobile device. Where the inferences are more optimal and more accurate, it can be expected that the selection of remote utilities exposed to the user will be more pertinent to the context of the user.

At 840, an automatic determination can be made regarding what remote utilities are to be made available to the mobile device user. This determination can be based, at least in part, on the formed inference. Moreover, the determination can include purely deterministic analysis, inferential analysis, or combinations thereof, as herein discussed. At this point methodology 800 can end.

Figure 9:
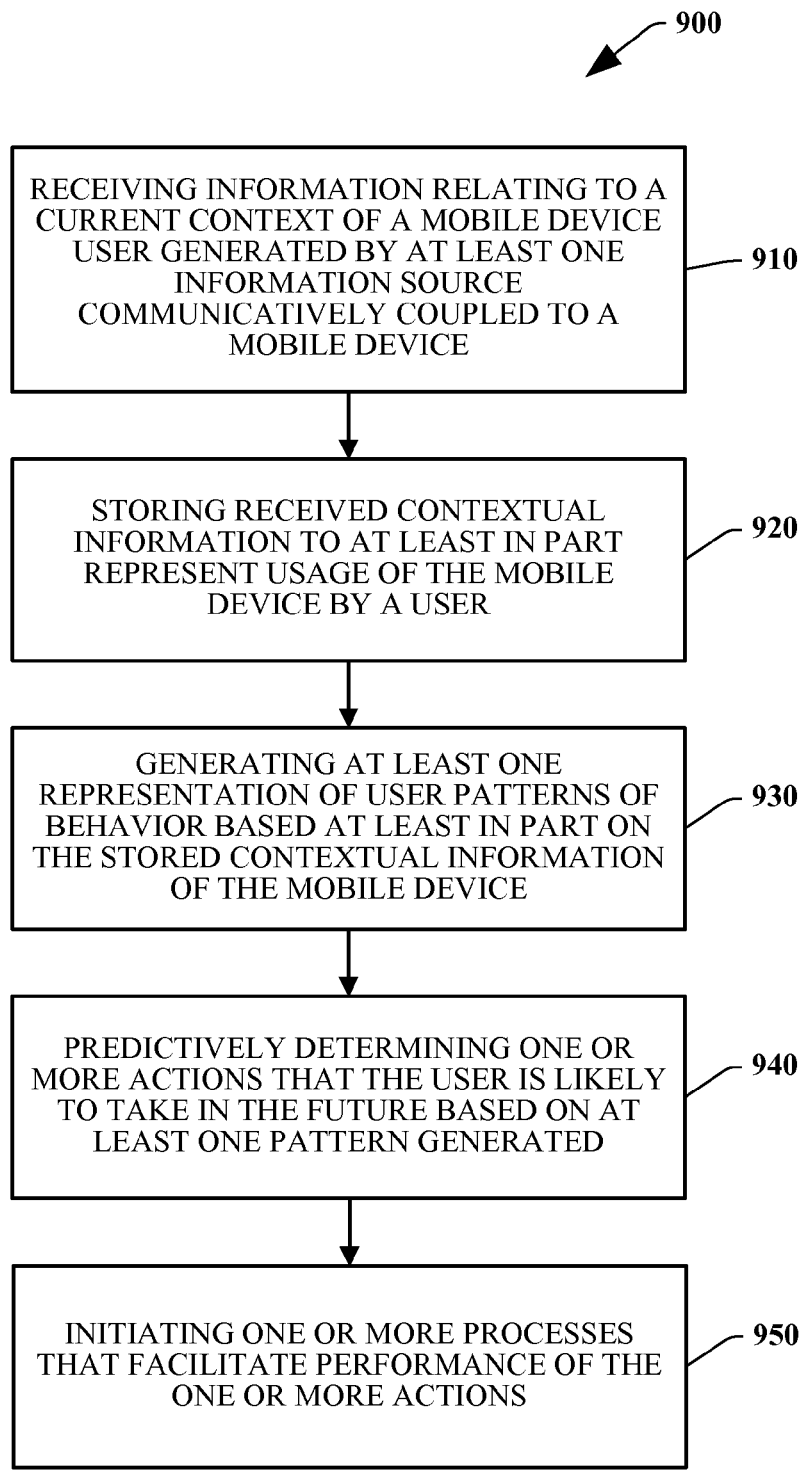
FIG. 9 illustrates a methodology that facilitates predicatively determining actions a user is likely to take and facilitating those actions in accordance with an aspect of the disclosed subject matter.

FIG. 9 illustrates a methodology 900 that facilitates predicatively determining actions a user is likely to take and facilitating those actions in accordance with an aspect of the disclosed subject matter. At 910, information received can be related to the current context of a mobile device user. This data can be from information source components as discussed herein.

At 920, the contextual information received can be stored. The stored data can represent usage data that is logged in a usage store to represent the contextual usage of the mobile device by a user. This information can form a portion of a user profile or part of a profile store containing historical data that can be employed when forming inferences relating to the context of a mobile device user, as herein discussed at length. Various portions of this data can also be made available to remote utilities to further refine proffered remote utilities, thus potentially benefitting the user by having more customized remote utilities available to better match the user's needs.

At 930, an intelligent agent can process the information received to generate a representation of the behavioral or usage patterns of the mobile device user. These representations of the user's behavior can be based, at least in part, on the stored contextual information received. Essentially, by analyzing the historic behavior of a mobile device user, a fair forecast of future user actions can be formed by determining the user's patterns of behavior. Where a predictive inference about user behavior is formed, it can be leveraged to sift, sort, and make available only pertinent remote utilities to the user of a mobile device.

At 940, the intelligent agent can predictively determine one or more actions that a user is likely to take in the future based on at least one pattern determined from the usage store. At 950, one or more processes can be initiated by the intelligent agent that facilitates performance of the one or more actions. At this point methodology 900 can end. As herein discussed at length, a mobile device with an intelligent agent can form inferences to provide more optimal and seamless access to appropriate remote utilities, facilitating an improved user experience. Where contextual information is stored and analyzed to form representative user behavioral patterns based on information, such as historical information from information sources, historical selections of remote utilities, and/or historical accuracy of prior deterministic and inferential determinations, future predictive modeling of the user's behavior can be successively improved. Generally, the intelligent agent can continue to learn and improve the predictions being made about the mobile device user over time.

Figure 10:
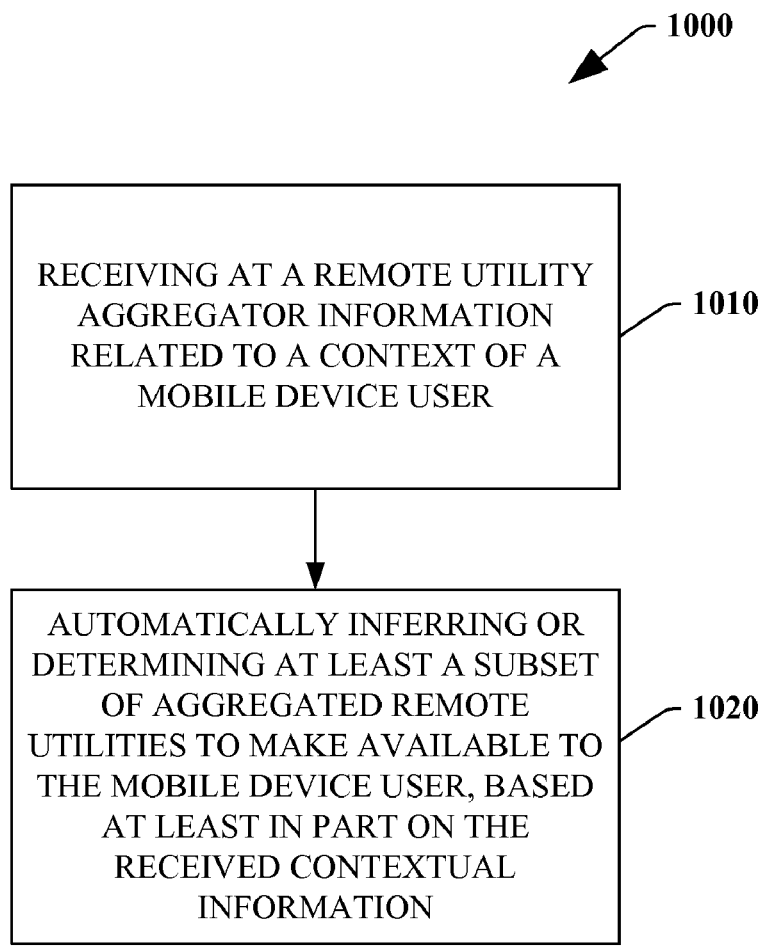
FIG. 10 illustrates a methodology employing an aggregator to that facilitate automatically determining what remote utilities to make available to a user in accordance with an aspect of the disclosed subject matter.

FIG. 10 illustrates a methodology 1000 employing an aggregator to that facilitate automatically determining what remote utilities to make available to a user in accordance with an aspect of the disclosed subject matter. At 1010, information related to the context of a mobile device user can be received at an aggregator. Where an aggregator, as herein discussed, can aggregate remote utilities or information relating to remote utilities, information passed to the aggregator can allow more efficient selection of appropriate remote utilities to be communicated to an intelligent agent, customization of remote utilities can be performed to create more useful remote utilities for the user, and accessing remote utilities can be more efficient that contacting numerous smaller sets of remote utilities.

At 1020, an inference or determination can automatically be formed such that at least a subset of the aggregated remote utilities can be made available to a mobile device user. The inference or determination can be formed in relation to the received contextual information. At this point methodology 1000 can end.

In an aspect, an intelligent agent can reside at an aggregator (in place of, or in addition to, intelligent agents located with mobile devices) to form inferences and determinations similar to, or the same as, those described for intelligent agents residing with mobile devices. In this aspect, the functionality of an intelligent agent, as herein described, can be viewed as being duplicated or shifted, at least in part, from the mobile device to a remote utility aggregator. Where additional processing power can be achieve in an aggregator and sufficient communication bandwidth exists, offloading intelligent agent processing to an aggregator can be beneficial by, for example, reducing the size and power consumption of a processor in a mobile device, allowing centralized control of updating an intelligent agent to a larger entity than a single mobile device user, and/or allowing the intelligent agent to drive remote utility refinement along trends in wider groups of mobile device users.

Figure 11:
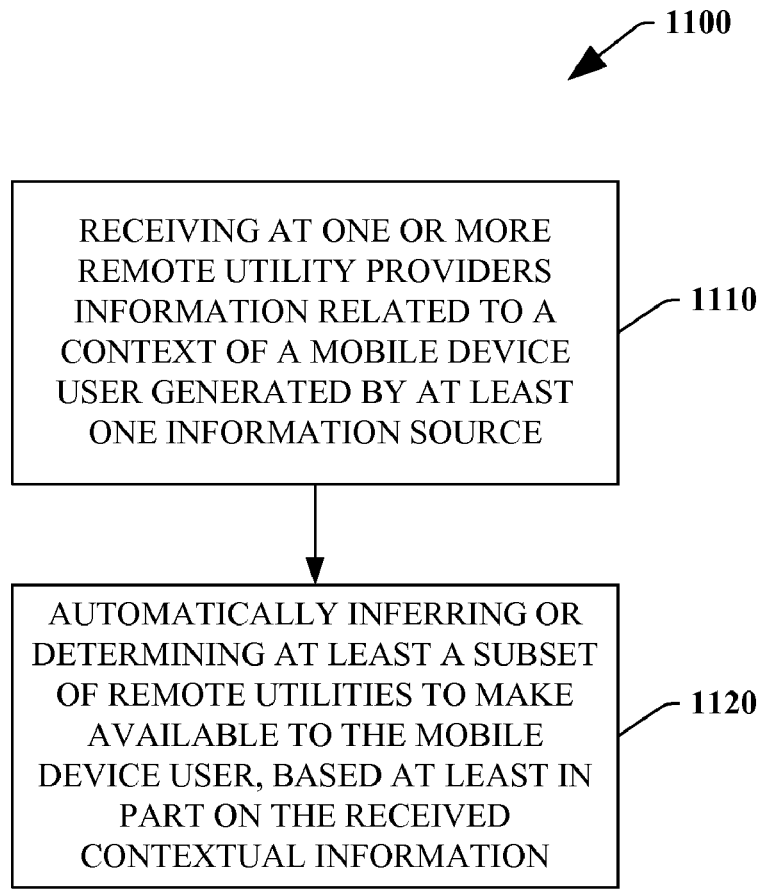
FIG. 11 illustrates a methodology employing a plurality of remote utility providers to that facilitate automatically determining what remote utilities to make available to a user in accordance with an aspect of the disclosed subject matter.

FIG. 11 illustrates a methodology 1100 employing a plurality of remote utility providers to that facilitate automatically determining what remote utilities to make available to a user in accordance with an aspect of the disclosed subject matter. At 1110, information can be received by one or more remote utilities relating to contextual information of a mobile device user. The information from information sources that herein have been described as being passed to intelligent agents in mobile devices can also be shared with remote utilities directly or indirectly to facilitate the remote utilities becoming customized to the benefit of a mobile device user. For example, a user's preference for female news anchors in news content provided by remote utilities can be communicated not only to the intelligent agent of the mobile device to facilitate selecting a remote utility with a female news anchor, but also to numerous remote utilities, such that they can tailor their news content to provide news from a female anchor. Further, the information can be communicated to remote utilities without being communicated to the mobile device. This can be seen as broadcasting primitive preferential information to providers of content, service, and/or applications.

At 1120, determinations and inferences can automatically be formed to determine a subset of available remote utilities to be made available to a mobile device user. This determination, as described herein, can be formed by intelligent agents in a mobile device. However, where the remote utilities have been given additional information relating to the context of a mobile device user, the available remote utilities can be custom tailored remote utilities that can be more beneficial to the mobile device user. At this point methodology 1100 can end.

Figure 12:
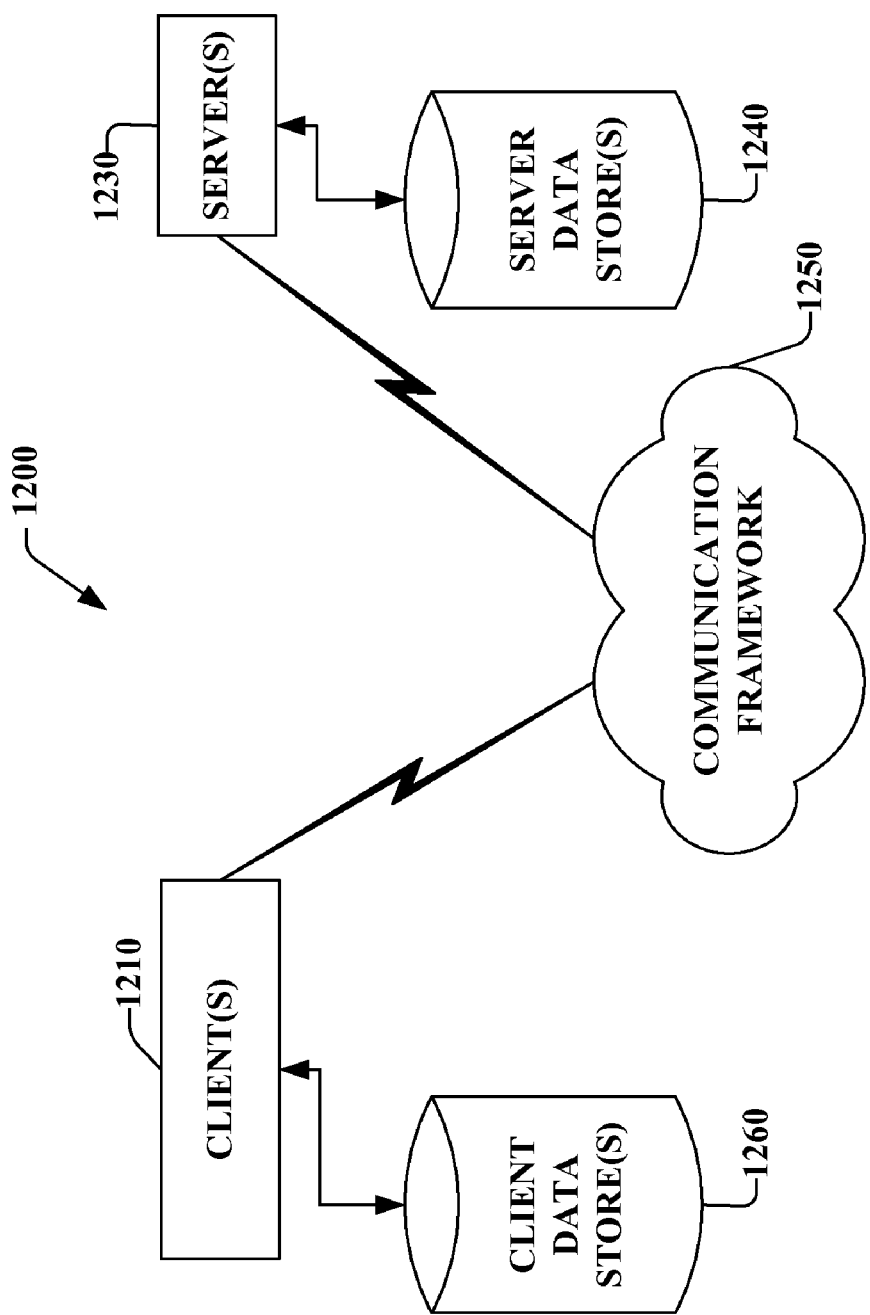
FIG. 12 illustrates an exemplary computing device in accordance with embodiments described herein.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can be hardware and/or software (e.g., threads, processes, computing devices). The servers 1230 can house threads or processes to perform transformations by employing the subject invention, for example.

One possible means of communication between a client 1210 and a server 1230 can be in the form of a data packet adapted to be transmitted between two or more computer processes. The system 1200 includes a communication framework 1240 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

Figure 13:
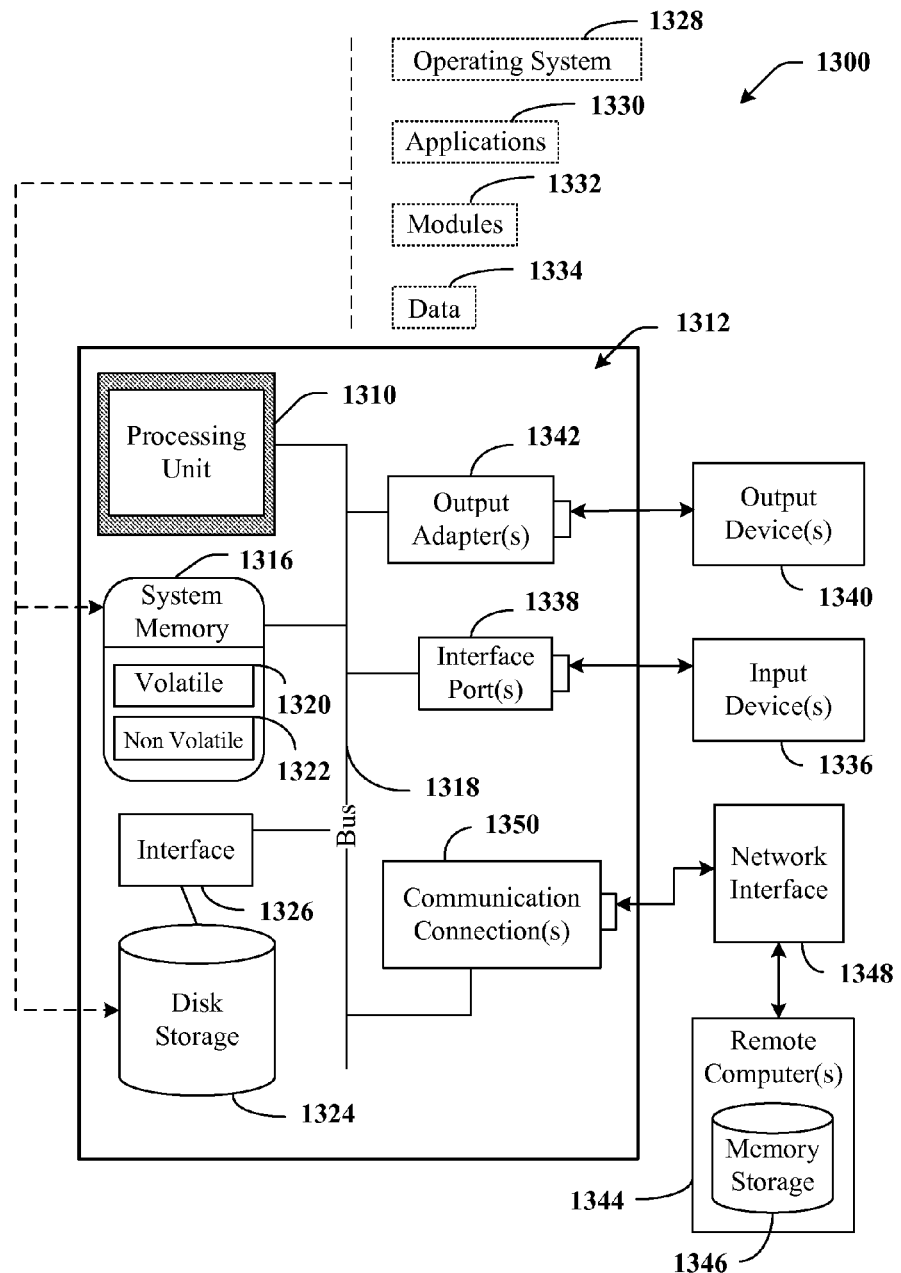
FIG. 13 illustrates an exemplary computing device in accordance with embodiments described herein.

With reference to FIG. 13, an exemplary environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, Ethernet cards, cellular telephone communications systems, and wireless networking systems (e.g., 802.11 a/b/g/n, . . . ).

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method, comprising:
   receiving a request for a subset of remote utilities for a mobile device as a function of the remote utilities available to the mobile device and a context of the mobile device, wherein the remote utilities include at least one of a service, an application, or content; and
   providing the subset of the remote utilities in response to the request.

2. The method of claim 1, wherein the receiving further comprises receiving the request for the subset of remote utilities for the mobile device based on at least one of a location of the device, device usage history, a cost associated with device usage, a cost associated with the subset of the remote utilities, compatibility of the subset of the remote utilities with the mobile device, or a device preference.

3. The method of claim 2, further comprising:
   predicting a predicted usage of the mobile device based on the device usage history and the context of mobile device.

4. A system, comprising:
   means for receiving information relating to a context of a mobile device;
   means for determining available remote utilities that are available to the mobile device, wherein the remote utilities include at least one of a service, an application, or content; and
   means for determining a first subset of the available remote utilities based on the information.

5. The system of claim 4, further comprising means for receiving the first subset of the available remote utilities at the mobile device in response to a determination of the first subset of the available remote utilities by the means for determining.

6. The system of claim 5, further comprising, means for modifying the interface of the mobile device at least as a function of the first subset of the available remote utilities.

7. The system of claim 4, further comprising means for inferring an action the mobile device is likely to perform in the future based on the information.

8. The system of claim 7, further comprising:
means for receiving a second subset of the available remote utilities based on an output of the means for inferring.

9. The system of claim 4, wherein the means for receiving the information comprises means for receiving at least one of: location information, usage information, usage history information, cost information associated with usage, cost information associated with the available remote utilities, compatibility information of the available remote utilities with the mobile device, or device preference information.

10. The system of claim 4, further comprising:
means for receiving usage data representing usage of the mobile device;
means for logging the usage data in a usage data store;
means for determining a pattern based on the usage data;
means for predicting an action that the device is likely to perform based on the pattern; and
means for initiating a process that facilitates performance of the action.

11. The system of claim 10, wherein the means for initiating includes means for determining a second subset of the available remote utilities that facilitate performance of the one or more actions.

12. The system of claim 11, further comprising means for storing data representative of the second subset of the available remote utilities and means for receiving the second subset of the available remote utilities in response to the one or more actions being initiated by the mobile device.

13. The system of claim 4, wherein the means for determining the available remote utilities further comprises:
means for aggregating availability information relating to the available remote utilities; and
means for communicating the availability information to the mobile device.

14. The system of claim 4, wherein the means for determining the first subset of the available remote utilities comprises means for determining remote utilities that facilitate an action of the mobile device.

15. The system of claim 4, further comprising means for determining a second subset of the available remote utilities based on a functionality of the mobile device as related to a dynamically changing context of the mobile device.

16. A system, comprising:
means for generating information related to a context of a mobile device; and
means for communicating the information to an intelligent agent component for determination of a first subset of remote utilities available to the mobile device that facilitate usage of the mobile device, wherein the remote utilities include at least one of an application, a service, or content.

17. The system of claim 16, wherein the means for generating includes means for generating the information related to at least one of: device usage, a device location, device usage history, a cost associated with device usage, a cost associated with the first subset of remote utilities, compatibility of the first subset of remote utilities with the mobile device, or a device preference.

18. The system of claim 16, wherein the means for generating includes means for generating the information from at least one of: a sensor, an information store, an image data store, an audio data store, a location data store or data input to the mobile.

19. The system of claim 16, further comprising means for receiving the first subset of remote utilities at the mobile device.

20. The system of claim 19, wherein the first subset of remote utilities optimize an aspect of a predicted usage of the mobile device.

21. The system of claim 16, further comprising:
means for storing data including means for storing at least a portion of the information; and
means for receiving a second subset of remote utilities available to the mobile device that facilitate performance of a predicted future action based on a pattern in the data.

22. A system, comprising:
means for receiving a request for a subset of remote utilities for a mobile device as a function of the remote utilities available to the mobile device and a context of the mobile device, wherein the remote utilities include at least one of a service, an application, or content; and
means for providing the subset of the remote utilities in response to the request.

23. The system of claim 22, wherein the means for receiving the request further comprises means for receiving a request for the subset of remote utilities for the mobile device based on at least one of a location of the device, device usage history, a cost associated with device usage, cost associated with the subset of remote utilities, compatibility of the subset of remote utilities with the mobile device, or a device preference.

24. The system of claim 23, wherein the subset of remote utilities facilitate a predicted usage of the mobile device, and the predicted usage of the mobile device is based on the device usage history and the context of mobile device.

25. A computer readable storage medium comprising computer executable instructions that, in response to execution, cause an apparatus to perform operations, comprising:
receiving a request for a subset of remote utilities for a mobile device as a function of the remote utilities available to the mobile device and a context of the mobile device, wherein the remote utilities include at least one of a service, an application, or content; and
providing the subset of the remote utilities to the mobile device in response to the request.

26. The computer readable storage medium of claim 25, wherein the receiving the request further comprises receiving a request for the subset of remote utilities for the mobile device based on at least one of a location of the device, device usage history, a cost associated with device usage, a cost associated with the subset of remote utilities, compatibility of the subset of remote utilities with the mobile device, or a device preference.

27. The computer readable storage medium of claim 26, wherein the subset of remote utilities facilitate a predicted usage of the mobile device, and the predicted usage of the mobile device is based on the device usage history and the context of mobile device.

28. A computer readable storage medium comprising computer executable instructions that, in response to execution, cause an apparatus to perform operations, comprising:

receiving information relating to at least a context of a mobile device;

determining available remote utilities that are available to the mobile device, wherein the available remote utilities include at least one of a service, an application, or content; and determining at least a first subset of the available remote utilities based at least on the information.

29. The computer readable storage medium of claim 28, the operations further comprising receiving at least the first subset of the available remote utilities at the mobile device in response to the determining of at least the first subset of the remote utilities.

30. The computer readable storage medium of claim 29, further comprising operations for, modifying the interface of the mobile device at least as a function of the first subset of the available remote utilities.

31. The computer readable storage medium of claim 28, the operations further comprising inferring an action the mobile device is likely to perform based at least on the information.

32. The computer readable storage medium of claim 31, the operations further comprising receiving a second subset of the available remote utilities based at least on the inferring.

33. The computer readable storage medium of claim 28, wherein the receiving the information comprises receiving at least one of: location information, usage information, usage history information, cost information associated with usage, cost information associated with the first subset of the remote utilities, compatibility information of the first subset of the remote utilities with the mobile device, or device preference information.

34. The computer readable storage medium of claim 28, the operations further comprising:
receiving at least usage data representing usage of the mobile device;
logging at least the usage data in a usage data store;
determining at least one pattern based on at least the usage data;
predicting at least one action that the device is likely to perform based on the at least one pattern; and
initiating at least one process that facilitates performance of the at least one action.

35. The computer readable storage medium of claim 34, wherein the initiating includes determining a second subset of the available remote utilities that facilitate performance of the at least one action.

36. The computer readable storage medium of claim 35, the operations further comprising storing data representative of the second subset of the available remote utilities and receiving the second subset of the available remote utilities in response to the at least one action being initiated by the mobile device.

37. The computer readable storage medium of claim 28, wherein the determining the available remote utilities comprises:
aggregating availability information relating to the available remote utilities; and
communicating the availability information to the mobile device.

38. The computer readable storage medium of claim 28, wherein the determining at least the first subset of the available remote utilities comprises determining remote utilities that facilitate at least one action of the mobile device.

39. The computer readable storage medium of claim 28, the operations further comprising determining at least a second subset of the available remote utilities based on at least one functionality of the mobile device as related to at least a dynamically changing context of the mobile device.

40. A computer readable storage medium comprising computer executable instructions that, in response to execution, cause a computing device to perform operations, comprising:
generating information related to at least a context of a mobile device; and
communicating the information to an intelligent agent component for determination of a first subset of remote utilities available to the mobile device that facilitate usage of the mobile device, wherein the remote utilities include at least one of an application, a service, or content.

41. The computer readable storage medium of claim 40, wherein the generating includes generating the information related to at least one of: device usage, a device location, device usage history, a cost associated with device usage, a cost associated with the first subset of the remote utilities, compatibility of the first subset of the remote utilities with the mobile device, or a device preference.

42. The computer readable storage medium of claim 40, wherein the generating includes generating the information from at least one of: a sensor, an information store, an image data store, an audio data store, a location data store or data input to the mobile device.

43. The computer readable storage medium of claim 40, the operations further comprising receiving the first subset of remote utilities at the mobile device.

44. The computer readable storage medium of claim 43, wherein the first subset of remote utilities optimize an aspect of a predicted future usage of the mobile device.

45. The computer readable storage medium of claim 40, the operations further comprising
storing at least a portion of the information; and
receiving a second subset of remote utilities available to the mobile device that facilitate performance of the at least one predicted future action based on at least one pattern determined as a function of at least the portion of information.

* * * * *